(12) United States Patent
Dempster

(10) Patent No.: US 7,726,911 B1
(45) Date of Patent: *Jun. 1, 2010

(54) UNDERWATER HYDROGEN STORAGE

(76) Inventor: Harry Edward Dempster, c/o Joseph G. Swan, 1334 Parkview Ave., Suite 100, Manhattan Beach, CA (US) 90266

( * ) Notice: Subject to any disclaimer, the term of this patent is extended or adjusted under 35 U.S.C. 154(b) by 201 days.

This patent is subject to a terminal disclaimer.

(21) Appl. No.: 11/774,757

(22) Filed: Jul. 9, 2007

Related U.S. Application Data

(63) Continuation of application No. 10/685,832, filed on Oct. 14, 2003, now Pat. No. 7,242,107.

(60) Provisional application No. 60/454,665, filed on Mar. 17, 2003.

(51) Int. Cl.
*E02D 27/38* (2006.01)

(52) U.S. Cl. ........................ 405/210; 114/256

(58) Field of Classification Search ................ 405/210, 405/203, 205, 207; 114/256
See application file for complete search history.

(56) References Cited

U.S. PATENT DOCUMENTS

| | | | |
|---|---|---|---|
| 2,990,796 A * | 7/1961 | Cole et al. | 405/210 |
| 3,541,588 A | 11/1970 | Ragland | |
| 3,828,565 A * | 8/1974 | McCabe | 405/210 |
| 3,934,528 A | 1/1976 | Horton et al. | |
| 3,943,724 A * | 3/1976 | Banzoli et al. | 405/210 |
| 4,209,271 A * | 6/1980 | McCabe et al. | 405/210 |
| 4,850,190 A | 7/1989 | Pitts | |
| 5,224,962 A * | 7/1993 | Karal et al. | 405/210 |
| 5,899,637 A * | 5/1999 | Blanchard et al. | 405/210 |
| 6,104,097 A | 8/2000 | Lehoczky | |
| 6,796,379 B1 * | 9/2004 | Martin | 405/210 |
| 6,833,631 B2 | 12/2004 | Van Breems | |
| 6,860,219 B1 * | 3/2005 | Dempster | 114/264 |
| 6,935,808 B1 * | 8/2005 | Dempster | 405/28 |
| 7,075,189 B2 | 7/2006 | Heronemus et al. | |
| 7,242,107 B1 * | 7/2007 | Dempster | 290/55 |
| 7,352,074 B1 | 4/2008 | Pas | |
| 2003/0168864 A1 | 9/2003 | Heronemus et al. | |

OTHER PUBLICATIONS

Office Action dated Jan. 26, 2009, in U.S. Appl. No. 11/554,587, which has the same inventor as the present application and has related claims.

* cited by examiner

*Primary Examiner*—Frederick L Lagman
(74) *Attorney, Agent, or Firm*—Joseph G. Swan, P.C.

(57) ABSTRACT

Provided are systems, methods and techniques by which a wind-powered energy generating platform, secured to an anchor, can pull (or winch) itself beneath the surface of the water and thereby avoid most of the significant effects of storms and waves. In more particularized aspects, a variable-buoyancy anchor is utilized, thereby facilitating the construction and transportation of the entire assembly.

20 Claims, 14 Drawing Sheets

Fig. 5
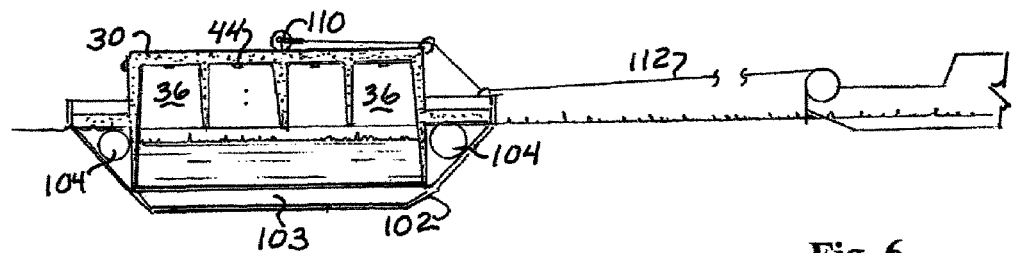
Fig. 6
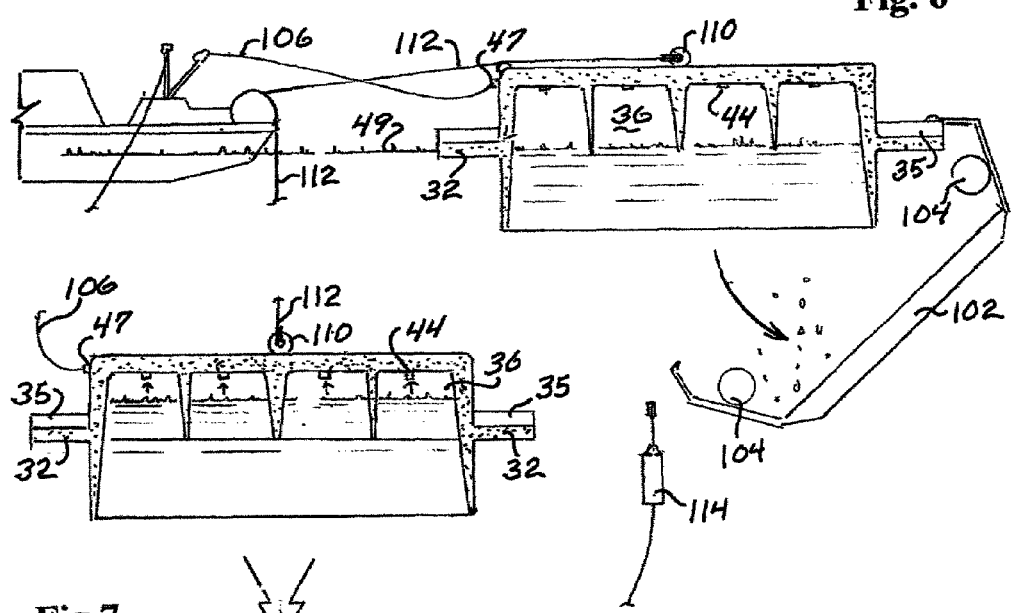
Fig. 7
Fig. 8
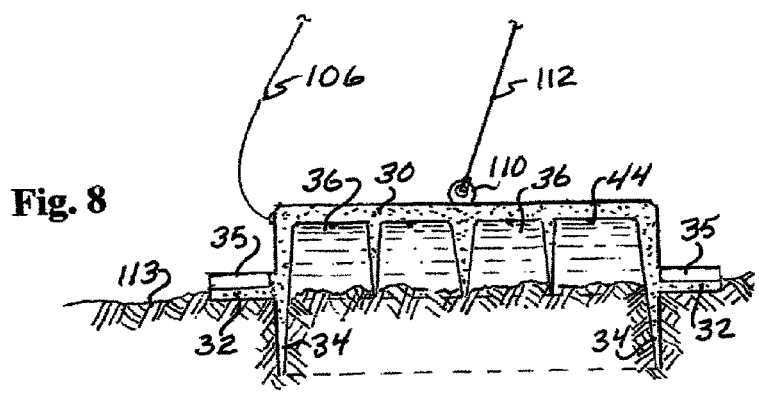

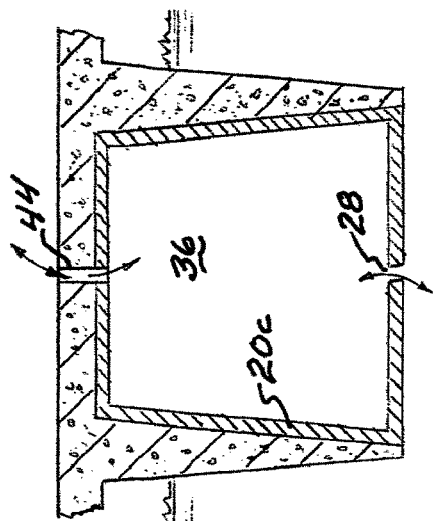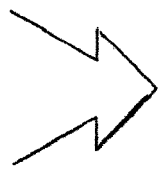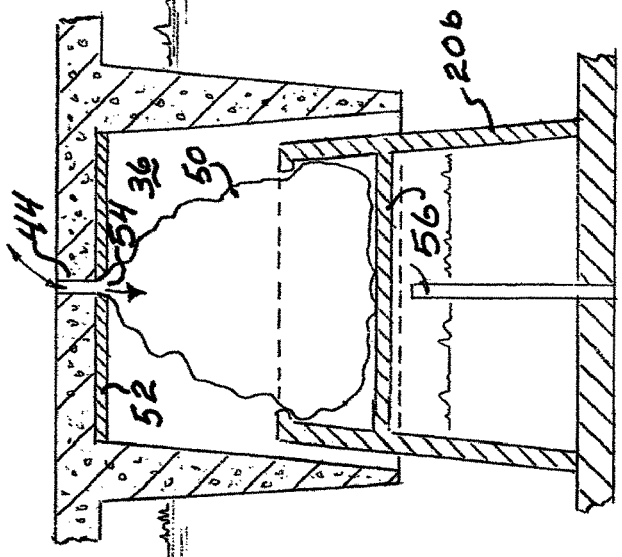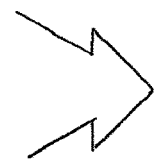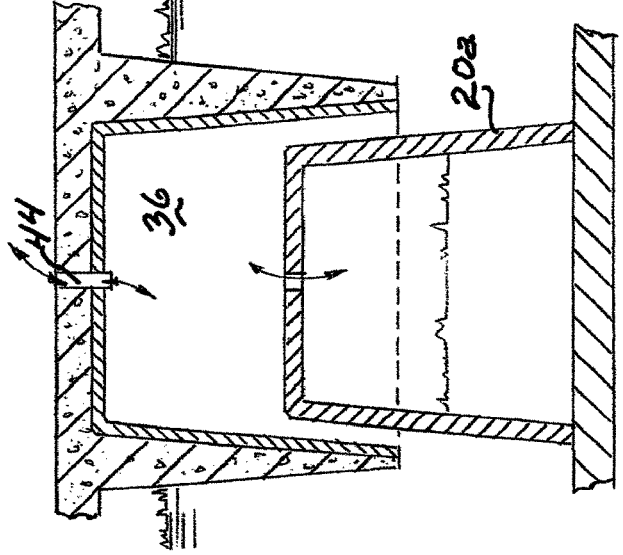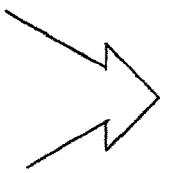

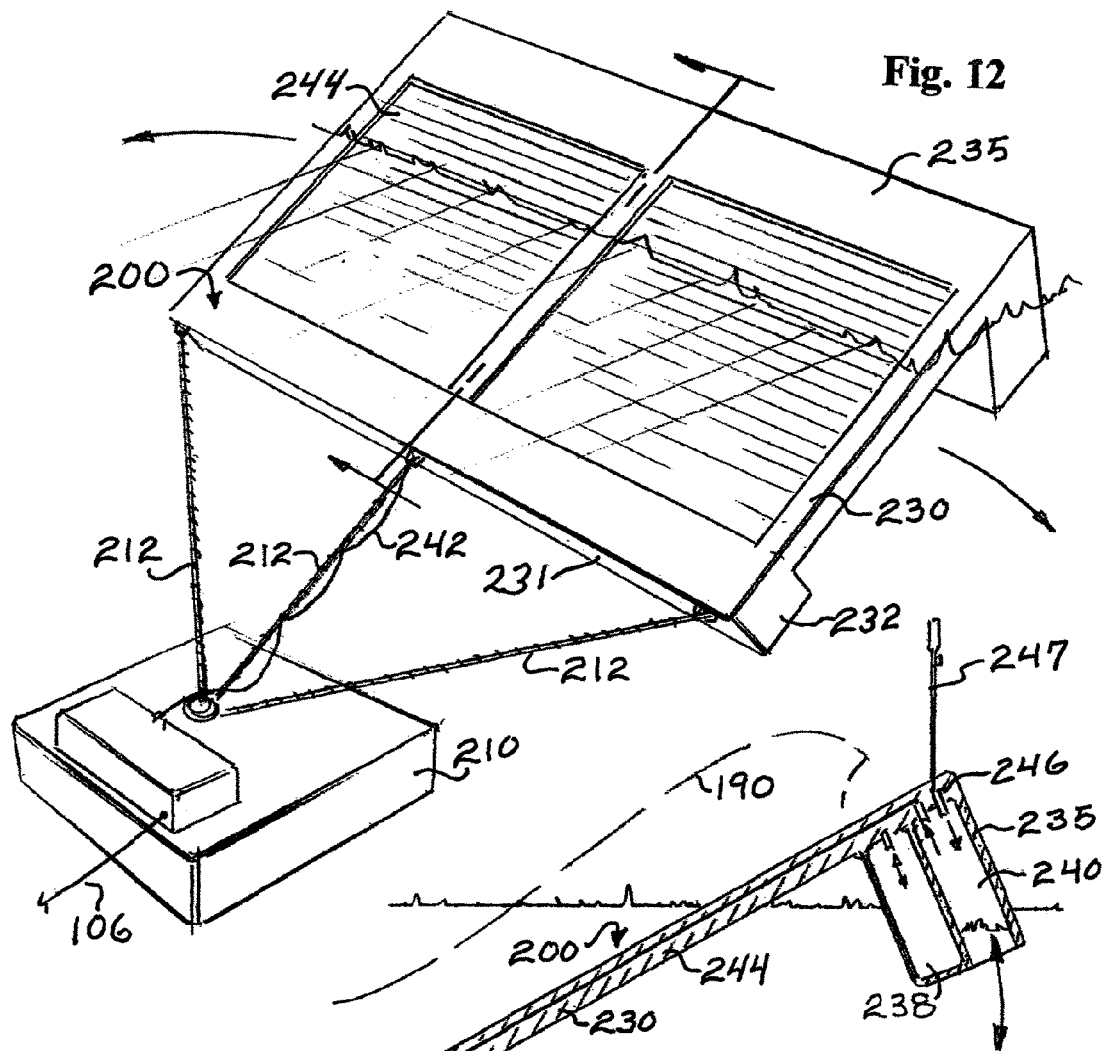
Fig. 12
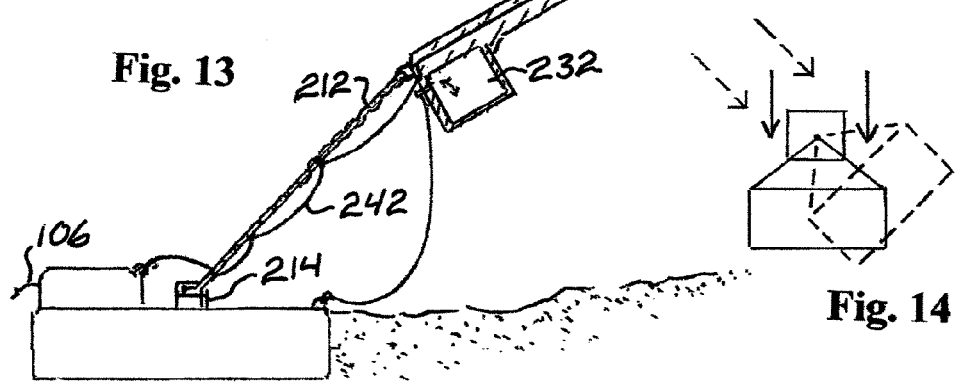
Fig. 13
Fig. 14

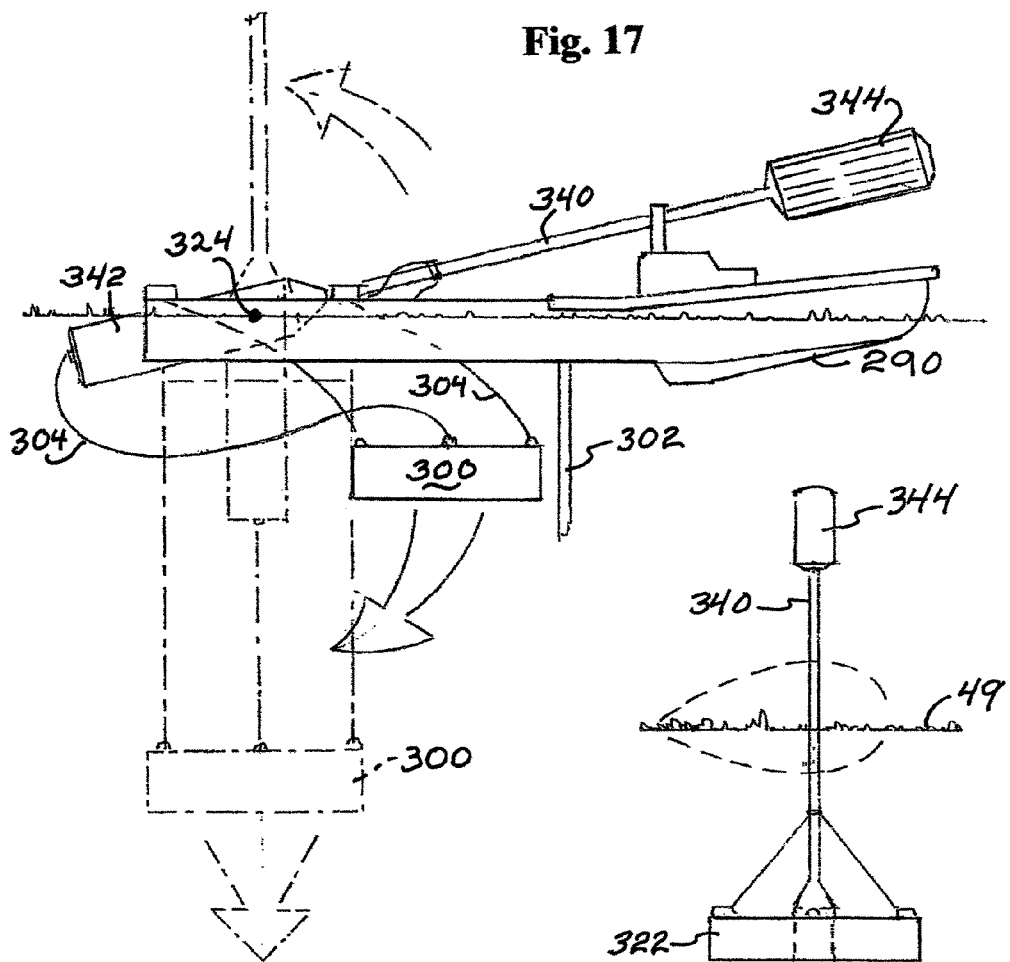
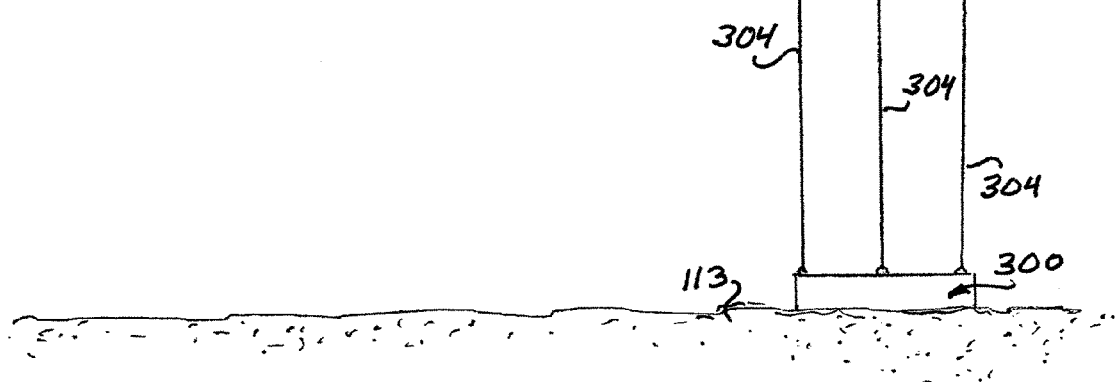
Fig. 17
Fig. 18

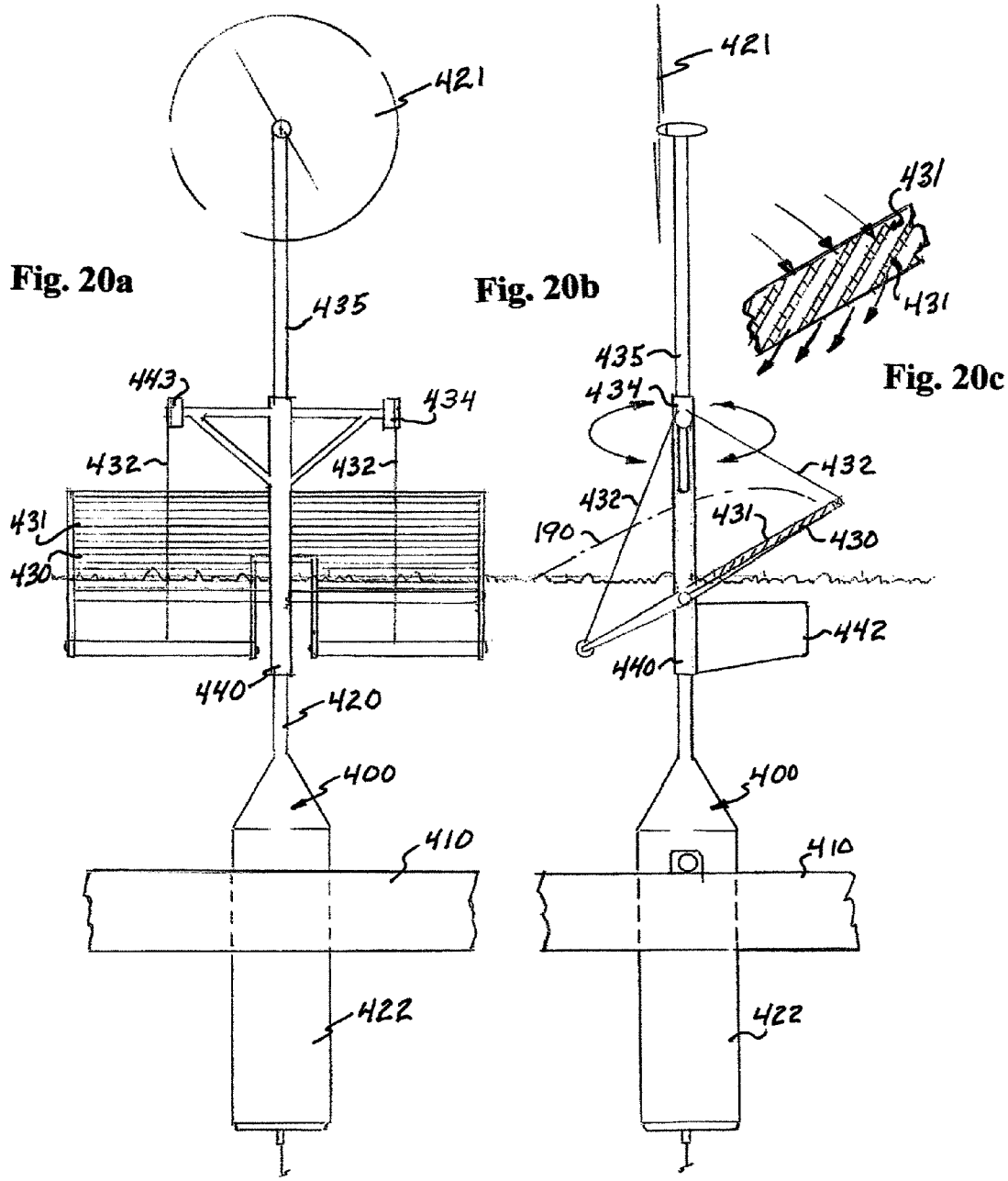

UNDERWATER HYDROGEN STORAGE

This application is a continuation of application Ser. No. 10/685,832, filed on Oct. 14, 2003, now U.S. Pat. No. 7,242,107, which claimed the benefit of U.S. Provisional Patent Application Ser. No. 60/454,665, filed on Mar. 17, 2003, and titled "Ocean Wave/Wind Driven Electrical Generating System". The foregoing applications are incorporated by reference herein as though set forth herein in full.

BACKGROUND OF THE INVENTION

1. Field of the Invention

The present invention pertains to wind-driven power generation (e.g., electrical power generation) in a water-based environment, and is particularly applicable to the placement of windmills on oceans and other deep bodies of water. The term "windmill" is used herein to mean any apparatus that converts wind energy to useful mechanical energy (typically, rotational mechanical energy).

2. Description of the Related Art

A fairly significant amount of effort has been directed toward generating usable energy from wind power. The advantages of wind power over competing potential energy sources are clear, i.e., wind power is a clean and renewable energy source. However, the costs of wind-powered energy generation often are significantly higher than the costs of alternative energy sources.

The most common conventional implementation of a wind-powered energy generation plant is a windmill farm, which involves the construction of a cluster of windmills on a fairly large area of land. An example is the windmill farm just outside of Palm Springs, Calif. Typically, a land-based windmill, such as is used in a windmill farm, has a plurality of elongated radially extending blades (or vanes) attached to a central rotor. Wind causes the vanes to rotate, turning the rotor, and this rotational energy is conveyed to an electrical generator, which in turn converts such kinetic rotational energy into electrical power.

This type of windmill is a horizontal-axis windmill, because the blades rotate about a horizontal axis. Less common are vertical-axis windmills in which the blades rotate about a vertical axis.

In order to be cost-effective, a windmill farm generally requires a large area of land in a location where strong (and preferably consistent) winds are present. However, very few such locations are available, particularly near the locations where power is needed most (e.g., in large cities or near certain manufacturing facilities). Moreover, where such potential windmill farm sites are available, it may be difficult or costly to obtain the necessary use permits that would enable one to construct a windmill farm.

In response to these difficulties, a number of proposals have been made to implement ocean-based (or other water-based) windmill facilities. Unlike land-based implementations, a water-based windmill often is of the vertical-axis turbine type. Beyond specified distances from the shore, an ocean-based wind-powered energy-generating facility generally will not require government permits. In addition, the large, unobstructed ocean areas provide an ideal environment for strong and consistent winds. However, these same conditions also give rise to more severe storms than generally are encountered on land. Such weather conditions and the potential for large and severe wave conditions make it difficult to construct a power generation facility that can avoid significant damage or destruction and thereby operate over the long term.

SUMMARY OF THE INVENTION

The present invention addresses this problem by providing systems, methods and techniques by which a wind-powered energy generating platform, secured to an anchor, can pull (or winch) itself beneath the surface of the water and thereby avoid most of the significant effects of storms and waves.

Thus, in one aspect the invention is directed to an apparatus for generating usable energy from wind power in a water environment, which includes an anchor having variable buoyancy. Platform means houses components of a wind-driven power-generating system, and also includes winching means for attaching the platform means to the anchor and then pulling the platform means beneath the water's surface. Wind-power conversion means, attached to the platform means, extends above the water's surface when the platform means is pulled beneath the water's surface and converts wind power into usable energy.

By virtue of the foregoing arrangement, it often is possible to provide a relatively low-cost apparatus for generating usable energy from wind power. In addition, because the foregoing configuration permits sensitive equipment to be located beneath the surface of the water, such equipment generally can be protected from the most severe ocean currents and turbulence conditions.

In more particularized aspects, the wind-power conversion means includes a tower that may be rotated into a vertical orientation during operation and then folded into a nearly horizontal orientation during a storage mode. For example, such rotation may be accomplished by varying the buoyancy of a ballast tank at the bottom of the tower. Such a storage mode preferably also includes the platform means winching itself further beneath the ocean's surface and, therefore, may be utilized when severe ocean conditions are predicted or actually detected.

In another particularized aspect, the anchor includes a plurality of open-bottomed cavities for controlling its buoyancy. And as a result, the anchor can be fabricated, if desired, using the techniques described herein, thereby further reducing costs of production and transportation.

Ordinarily, the usable energy generated by the foregoing apparatus will be electricity. However, such electricity may also be used to generate hydrogen from ocean water. Still further, the usable energy may comprise stored mechanical energy.

In another aspect, the invention is directed to a method for generating usable energy from wind power in a water environment. Initially, an anchor and a platform assembly are towed to a use site, the platform assembly including a platform, a winch, a windmill and components for converting mechanical energy produced by the windmill into stored energy, and the anchor being attached to the platform by a cable. The anchor is then submerged at the use site, and the winch is used to pull the platform to a use position below the surface of the water. In the use position, the windmill extends substantially vertically from the platform beneath the water to a point above the surface of the water.

The foregoing summary is intended merely to provide a brief description of the general nature of the invention. A more complete understanding of the invention can be obtained by referring to the claims and the following detailed description of the preferred embodiments in connection with the accompanying figures.

BRIEF DESCRIPTION OF THE DRAWINGS

FIG. 5 is a cross-sectional view of an anchor according to a representative embodiment of the present invention, as it is being towed to its use site.

FIG. 6 is a cross-sectional view of an anchor according to the present invention while its wave shield is being removed.

FIG. 7 is a cross-sectional view of an anchor according to the present invention as it is being submerged.

FIG. 8 is a cross-sectional view of an anchor according to the present invention in position on the ocean floor.

FIGS. 9A-9C illustrate several of the possible alternative configurations for the interior of a structural cell, together with a technique for achieving each, of a fabricated structure according to the present invention.

FIG. 12 is a perspective view of a free-floating breakwater according to a representative embodiment of the invention.

FIG. 13 is a right side elevational view of the free-floating breakwater shown in FIG. 12.

FIG. 14 is a top plan view of a beach-and-anchor assembly according to the present invention, illustrating how the use of a swivel joint can allow the beach to automatically align itself to an incoming wave.

FIG. 17 is a side elevational view of the deployment assembly shown in FIG. 15, with the wave shield dropped, the windmill tower raised, and the anchor beginning to be submerged.

FIG. 18 is a side elevational view of a wind-driven power generating system in the fully deployed position, according to the present invention.

FIG. 20A illustrates a front plan view and FIG. 20B illustrates a side elevational view of a combined wave energy collector and wind-power-generating station according to the present invention.

FIG. 20C illustrates a cross-sectional view of a portion of the beach utilized in the combined breakwater and wind-power-generating station shown in FIGS. 20A and 20B.

DESCRIPTION OF THE PREFERRED EMBODIMENT(S)

The first section of the following disclosure describes a system and an apparatus for fabricating a variable-buoyancy structure, as well as discussing the configuration of the final structure itself. Subsequent sections describe various applications in which such a variable-buoyancy structure may be utilized.

Fabricating Technique and Platform

Figure 1:
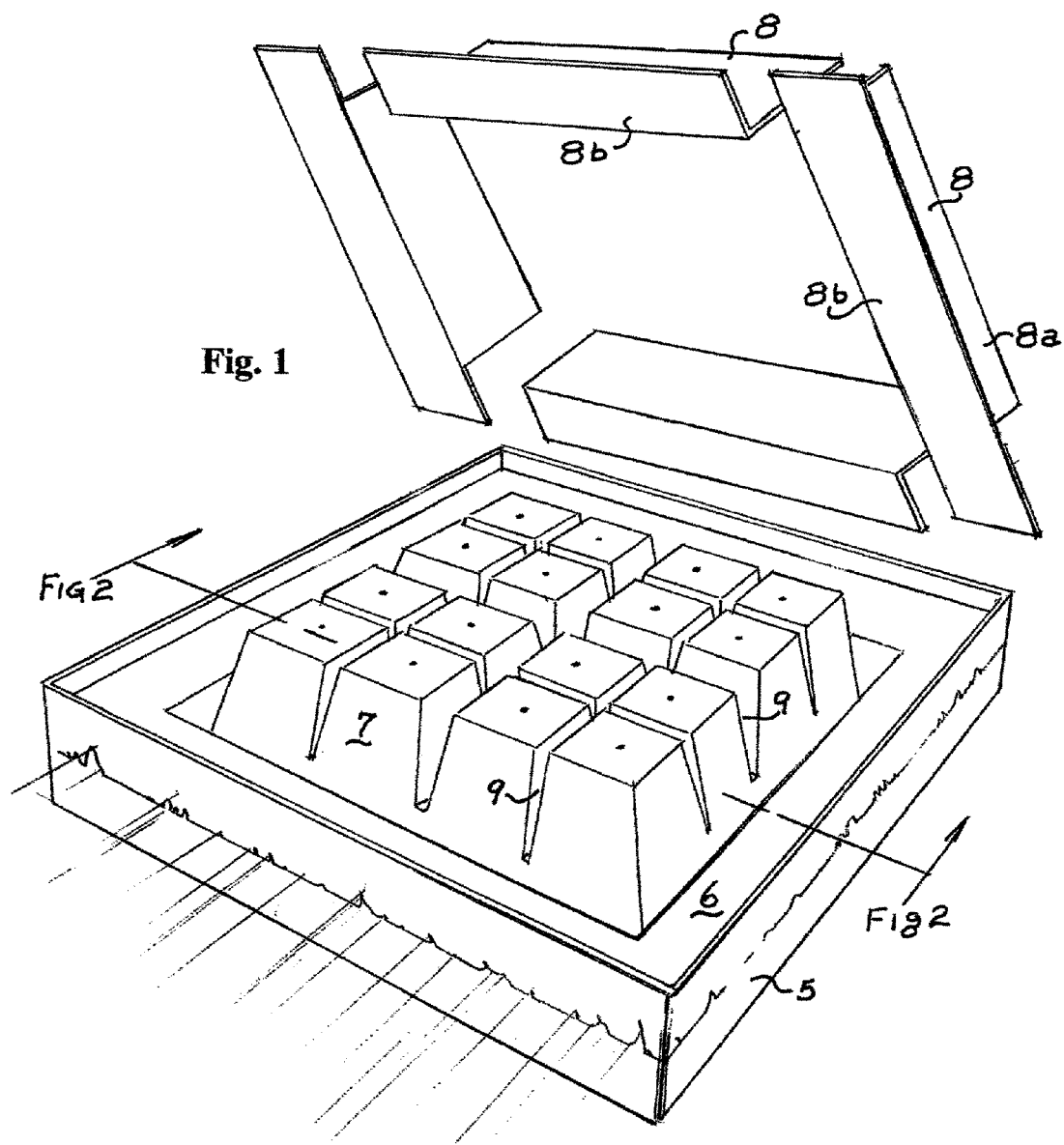
FIG. 1 is a perspective view of a floating platform that includes a mold for constructing a variable-buoyancy structure according to a representative embodiment of the invention.

FIG. 1 is a perspective view of a floating platform 5, having a top surface 6 upon which a mold can be formed for constructing an anchor or other variable-buoyancy structure according to the present invention. Preferably, platform 5 itself has variable buoyancy, allowing it to be submerged and then re-floated. This variable buoyancy may be achieved by installing an array of ballast tanks (e.g., bolted to a series of trusses) underneath surface 6, e.g., in a manner similar to how a conventional dry dock is constructed.

As shown in FIG. 1, platform 5 has a generally flat top surface 6 upon which an array of forming cells 7 are attached, with a gap 9 between adjacent forming cells 7. Gaps 9 may be provided, at least in part, by using the trapezoidal-shaped (or otherwise tapered) forming cells 7 illustrated in FIG. 1. The forming cells 7 may, for example, be bolted to the top surface 6 of platform 5. The result of attaching forming cells 7 is that the top of platform 5 has a waffle-iron-like appearance. Sidewalls 8 are then bolted to surface 6 of platform 5 and, together with forming cells 7, provide a mold for forming a variable-buoyancy structure. As shown, sidewalls 8 preferably have a substantially vertical wall portion 8a for forming the outer wall of the mold and a horizontal mounting portion 8b (which is essentially perpendicular to portion 8a) for bolting to surface 6. In short, platform 5 has a top flat surface 6 upon which the mold is formed.

The foregoing mold may be constructed on platform 5 in a variety of different ways. For example, the forming cells 7 and the sidewalls 8 may be simply bolted to the upper surface 6 of platform 5, as discussed above. Alternatively, forming cells 7 may be integrally formed with top surface 6 of platform 5. Preferably, the forming cells 7 are modular so that any number of such cells may be arranged on the surface 6 of platform 5 in order to fabricate a structure of any desired size, and in any desired shape. Thus, if the trapezoidal-shaped forming cells 7 illustrated in FIG. 1 are used, then a rectangular mold can be formed having any desired width and length (subject, of course, to the size of platform 5).

Figure 2:
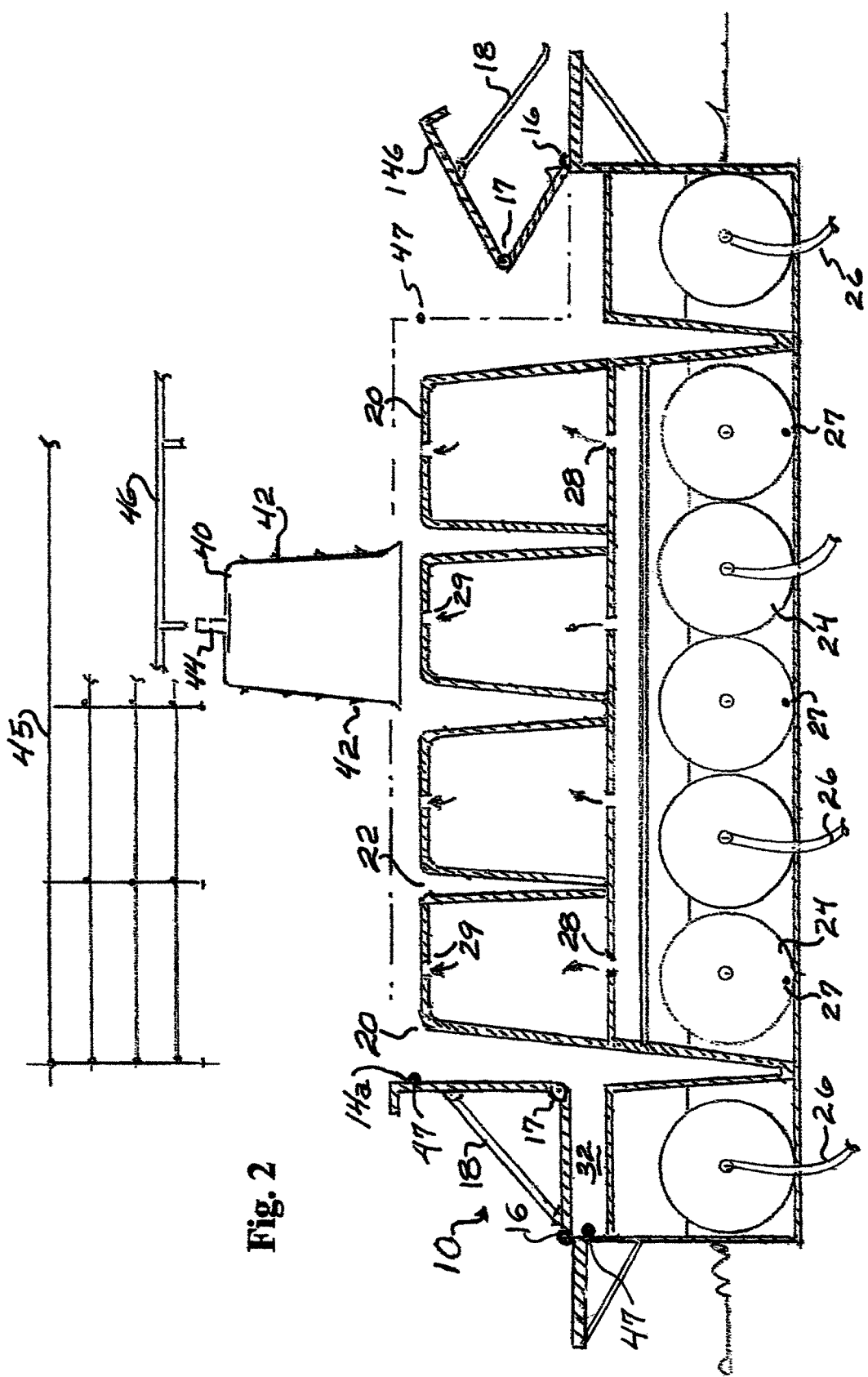
FIG. 2 is a cross-sectional view of a floating platform mold for constructing a variable-buoyancy structure according to a second representative embodiment of the invention.

An alternative platform 10 for constructing anchors and/or other variable-buoyancy structures according to the present invention is shown in FIG. 2. Unlike platform 5, which has a distinct mold constructed on top of it, platform 10 is integral with and actually forms mold 12. In short, platform 10 is largely indistinguishable from mold 12.

As shown in FIG. 2, the sidewalls 14 of the mold 12 fold away in a spring-form manner. That is, they are hinged along their lower edges 16 to the platform 10 (and may even be hinged at another edge 17 in order to facilitate such folding away). In use, i.e., when the mold 12 is being filled or is being prepared to be filled, the sidewalls 14 are raised to a substantially vertical orientation (i.e., the position of sidewall 14a) and locked into position, e.g., by using a locking bar 18. Upon completion of such filling and after the construction material has at least partially cured (e.g., the following day), the sidewalls 14 are simply folded away, as shown in connection with sidewall 14b.

Once again, the bottom of the mold 12 has a waffle-iron-like appearance, here consisting of a plurality of trapezoidal-shaped forming cells 20, with gaps 22 between adjacent forming cells 20. It is noted that in the present embodiments of the invention, the forming cells 20 are arranged in a regular rectangular array. However, any other configuration may instead be used.

The forming cells 20 may be fabricated from any of a variety of different types of materials, depending upon the desired useful life of the resulting mold 12. For example, any of the following materials may be used to fabricate the forming cells 20, listed in order from the shortest to the longest expected useful life: plywood, fiberglass or steel. In one embodiment described above, the forming cells 20 detach from the remainder of platform 10 and become a part of the fabricated structure. In this case, it generally will be preferable to construct forming cells 20 from a material that is capable of withstanding long periods of time underwater, such as concrete, fiberglass or another synthetic plastic or polymer.

As also shown in FIG. 2, platform 10 includes a number of ballast tanks 24 underneath the forming cells 20. Each ballast tank 24 is connected to an air pump (not shown) via an air line 26 for pumping air into ballast tanks 24 and also includes an electrically operable valve 27 for flooding each such ballast tank 24, thereby allowing a user to control the buoyancy of platform 10. In the preferred embodiment, each valve 27 and each air line 26 is separately controllable (or at least combinations of such valves 27 and air lines 26 are separately controllable), thereby allowing a user to adjust the trim of platform 10. In this regard, therefore, the variable buoyancy of platform 10 is achieved in a similar manner to the provision of variable buoyancy in conventional dry docks. However, other structures instead may be utilized to allow a user to vary the buoyancy of platform 10, with some of such other structures being described below.

As shown in FIG. 2, each forming cell 20 in the present embodiment is entirely or largely hollow, and includes an opening 28 in its bottom surface and an opening 29 in its top surface. The purpose of such openings 28 and 29 will become apparent below. It should be noted that either or both of openings 28 and 29 may be controllable, e.g., with the use of an electrical valve.

Figure 3:
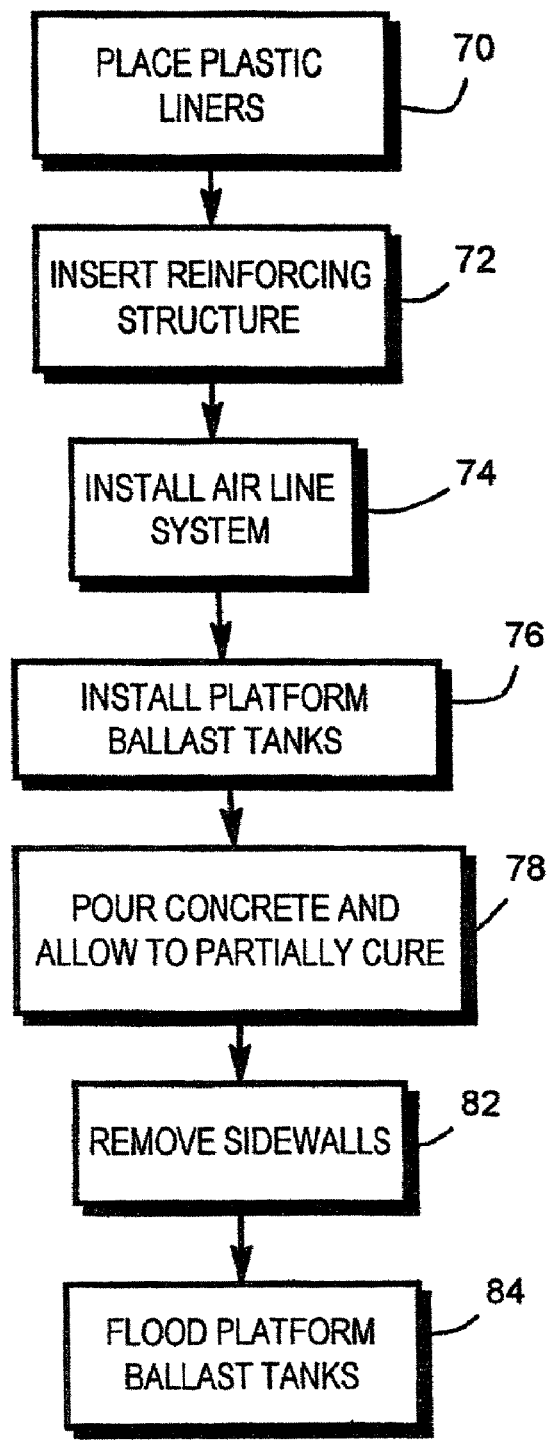
FIG. 3 is a flow diagram illustrating a technique for fabricating a variable-buoyancy structure according to the present invention.

FIG. 3 is a flow diagram illustrating how mold 12 may be used to fabricate a variable-buoyancy structure 30 according to the present invention. In order to simplify the following discussion, it is assumed that structure 30 is an anchor. However, as will become apparent below, construction of other types of variable-buoyancy structures also is contemplated. Also, the following discussion generally refers to platform 10 (shown in FIG. 2) and its components and therefore the following discussion should be read with reference to FIG. 2 (which illustrates the mold 12) and to FIG. 4 (which illustrates the completed variable-buoyancy structure 30). However, the emphasis on platform 10 is for ease of discussion only, and it should be understood that a similar procedure generally will be applicable for use with platform 5 (shown in FIG. 1). Where differences occur, such differences typically will be described below or otherwise will be readily apparent.

Initially, in step 70 a plastic liner 40 (see FIG. 2) is placed over each forming cell 20. As shown, the plastic liner 40 includes a plurality of spurs 42 extending outwardly from the main body of plastic liner 40. Such spurs 42 often can facilitate the attachment of the plastic liner 40 to the concrete or other construction material to be used (as discussed below). Each plastic liner 40 also includes an air inlet/outlet 44 (which preferably is configured as a nozzle or other type of port) for attachment to an air line 46. While inlet/outlet 44 is shown as being on top of liner 40, this is not necessary and, for example, it instead may be located on the side of liner 40. Also, while the liners 40 are made of plastic in the preferred embodiments of the invention, this type of material not critical. Rather, any other material that is generally waterproof instead may be used. Still further, while liners 40 are shown as having a mostly rigid structure they may instead be provided as a plastic bag, or similar less-rigid or easily deformable structure.

In step 72, pre-formed steel reinforcing bars are installed into mold 12 (i.e., between the forming cells 20). Although this step is not strictly required, the inclusion of reinforcing bars (or other reinforcing structure) often will significantly increase the strength of the resulting anchor (or other variable-buoyancy structure).

In step 74, an air-line system 45 is installed into mold 12. Basically, a network 45 of air lines 46 is attached to the air inlet/outlets 44 on the plastic liners 40 (see FIG. 2). All of such air lines 46 may interconnect to the structural cells 36 (see FIG. 4 below) that eventually will be formed by the forming cells 20 so that air flows freely between such structural cells 36. More preferably, however, a number of electrically operable valves, together with their electrical wiring and control circuitry, also are installed. For example, an electrical valve may be installed onto each air inlet/outlet 44 prior to attaching to the corresponding air line 46. Alternatively, or in addition, electrical valves may be embedded within the network of air lines 46 itself. Still further, rather than using a separate electrical valve for each resulting cell 36, a single electrical valve may be used to control the air supply to multiple cells 36. It should be understood that the foregoing options are design preferences, with the number of cells 36 controlled by each valve generally dictating the degree of control that may be exercised over the relative amounts of air in each cell 36. The relevance of this degree of control is described in more detail below.

In any event, the air lines 46 and electrical connections preferably are run to at least one point 47 that will be on the outside of (or at least on the edge of) mold 12, in order to provide user access upon completing the construction of the structure. More preferably, such outside access point(s) 47 have appropriate electrical connectors (for supplying control signals to the air valves) and fittings (for connecting to an external air-line system) for making underwater connections. In the preferred embodiments of the invention, air lines 46 are constructed from steel piping. However, any other rigid or flexible material instead may be used. More detail and additional options regarding the network 45 of air lines 46 are described below.

In step for 76, a ballast tank 35 (see FIG. 4) optionally is installed into the cavity for each shoulder 32. If such a ballast tank 35 is in fact utilized, the necessary air lines, electrical valves and electrical wiring for controlling the electrical valves preferably also are provided, together with air and electrical access point(s) 37 outside of (or at least on the edge of) mold 12, in order to permit a user to vary the relative amounts of air and water that fill ballast tanks 35 (thereby varying their buoyancy). Once again, such outside access points preferably have appropriate electrical connectors and fittings for making underwater connections.

In step for 78, concrete or other construction material is poured into mold 12. This may be done in multiple stages (e.g., 6-8 inches at a time), filling to a certain level, allowing the concrete to at least partially cure, and then filling to a higher level, in order to allow the reinforcing-bar structure to be appropriately positioned within mold 12. It should be noted that a variety of other construction materials may be used instead of concrete, and new construction materials may be utilized as they are developed. However, concrete currently is the preferred construction material and therefore will be referenced most often in the following discussion. The poured concrete then is allowed to at least partially cure (e.g., overnight).

In step 82, the sidewalls are removed or folded away. With regard to platform 5 (shown in FIG. 1), this will involve simply unbolting or otherwise removing the sidewalls 8. With regard to platform 10 (shown in FIG. 2), this will involve the release of locking bar 18 (or whatever alternate locking mechanism has been employed) and the folding away of sidewalls 14.

In step 84, the ballast tanks 24 of platform 10 are flooded, allowing platform 10 to submerge. In the process, platform 10 (including mold 12) pulls away from the structure 30 that has been formed. More specifically, in this embodiment, plastic liners 40 adhere to the poured concrete and the forming cells 20 separate from such plastic liners 40. The trapezoidal (or other tapered) shape of the forming cells 20 (and, accordingly, structural cells 36) generally facilitates this separation.

As discussed above, each forming cell 20 preferably includes a bottom opening 28 and a top opening 29. Opening 28 initially allowed air to enter the corresponding forming cell 20. As platform 10 is submerged, the air trapped in the forming cells 20 is pushed upward and through the corresponding holes 29 into the structural cells 36 (see FIG. 4). As a result, the newly formed structure 30 floats while the platform 10 sinks away. In this state, structure 30 may be left in the water until the concrete fully cures.

Figure 4:
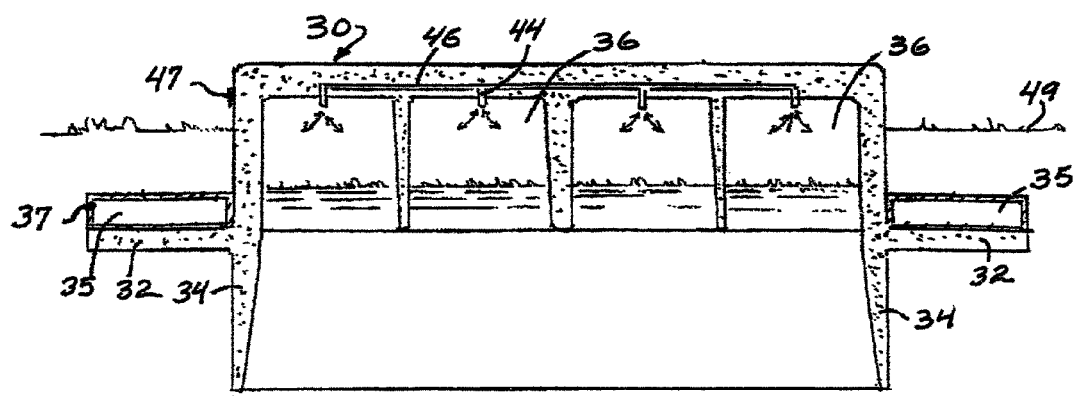
FIG. 4 is a cross-sectional view of an anchor fabricated according to the present invention.

FIG. 4 is a front elevational view of an anchor fabricated in accordance with the present invention, after platform 10 has been submerged. As shown, structure 30 includes structural cells 36, shoulders 32 with embedded ballast tanks 35, tapered downwardly extending projections 34 and an embedded system of air lines 46 connecting to an exterior access point 47. In the preferred embodiments of the invention, shoulders 32 (with embedded ballast tanks 35) and downward projections 34 (e.g., in the form of a wall) are provided around the entire periphery of structure 30.

As indicated in FIGS. 2 and 4, the structure 30 that is fabricated by the mold 12 preferably includes the following additional features that are not provided by the mold illustrated in FIG. 1. First, structure 30 includes a shoulder 32 that extends laterally outwardly along its periphery. Shoulder 32 is fairly wide, preferably on the order of 12 feet, for purposes that will be described in more detail below. Second, the structure 30 includes tapered downward projections 34 (in the form of a wall, in the current embodiment of the invention), extending along the entire periphery of structure 30. Once again, the function of projections 34 is described in more detail below.

Common to both the embodiment shown in FIG. 1 and the embodiment shown in FIGS. 2 and 4 is that the resulting structure includes a plurality of open-bottomed structural cells 36. These structural cells 36, of course, correspond to the forming cells (7 or 20, depending upon the embodiment), having been formed by them.

As noted above, the surface 6 of platform 5 can permit a mold of any desired size (up to the size of surface 6) and shape to be formed thereon. On the other hand, platform 10 is more integral with mold 12. As shown in FIG. 2, the foldaway sidewalls 14, having the downward extensions 34, typically will form the outer perimeter of platform 10, and therefore the dimensions of platform 10 generally will need to closely match the dimensions of the array of forming cells 20. Accordingly, in such an embodiment, the dimensions of platform 10 typically will have to be custom-selected based on the size of the structure 30 to be fabricated. This often may be accomplished using a modular structure and a modular sidewall 14.

After forming structure 30 in the manner described above, any additional desired components may be installed. For example, for the reasons indicated below, it may be preferable to install tilt sensors (e.g., mercury switches) on structure 30 in order to provide an indication as to whether structure 30 is level or not. In addition, larger components and/or structures may be built on top of structure 30.

In the preferred embodiment of the invention, structure 30 is rectangular-shaped, having a large top surface area, preferably on the order of 7,000 square feet. As a result, structure 30 presents significant resistance to upward movement. This, in addition to its weight helps structure 30 to function as an anchor. At the same time, anchor 30 preferably has a height from the bottom of shoulder 32 of approximately 12 feet, or a height-to-width ratio of approximately 5:1. By providing such dimensions, anchor 30 generally will have the desired properties.

It is noted that the sequence in which the fabricating steps described above (and shown in FIG. 3) are performed may be varied, as will be readily apparent. Accordingly, the order in which such steps are described above is not necessarily the order in which they will be performed. For example, step 74 may be performed prior to step 72.

Also, in a somewhat different embodiment of the foregoing fabrication process, the newly formed structure 30 may be allowed to submerge together with the platform 10. Then, air may be pumped into the structural cells 36, allowing the entire structure 30 to float free of the platform 10 while the platform 10 remains at the bottom of the water. In order to accomplish this alternate embodiment, it may be necessary to provide openings 28 with electrical valves, to provide openings 29 with electrical valves or to eliminate them entirely, and/or to partially winch structure 30 away from platform 10. However, one advantage of this alternate fabrication technique (in which the structure 30 initially is submerged together with the platform 10) is that the concrete may cure more slowly (in order to obtain a higher strength) if the structure 30 is fully submerged.

Still further, platform 10 initially may be separated from structure 30 by submerging platform 10 while keeping structure 30 in a floating state (in the manner described above). Then, structure 30 may be separately submerged (by venting the air out of structural cells 36), in order to allow the concrete to cure underwater.

In either case, the structure 30 preferably is separated from platform 10 by a difference in the buoyancy of the two structures, with both structures preferably having variable-buoyancy. This, together with the unique configuration of the mold of the present invention, allows for in-water construction of an anchor or other variable-buoyancy structure 30.

Ultimately, structure 30 ends up floating in the water, separated from platform 10 and with the majority of structure 30 beneath the surface 49 of the water, in the manner illustrated in FIG. 4. In this state, structure 30 may be towed to its intended use site. Such towing may be accomplished by any combination of pushing and/or pulling of the structure 30.

Prior to any such towing, however, a wave shield 102 (referring to FIG. 5) preferably is installed underneath structure 30. In this regard, wave shield 102 may be comprised of a sequence of panels having a floating section 103 along its bottom (which may have positive flotation or may be configured as a variable-buoyancy ballast tank) and also having ballast tanks 104 mounted at its front and rear ends. With ballast tanks 104 flooded (at least partially), wave shield 102 is towed underneath structure 30, and then ballast tanks 104 are floated, causing wave shield 102 to come up underneath structure 30, resulting in the configuration illustrated in FIG. 5. After installing wave shield 102, structure 30 may be towed to a desired location, with wave shield 102 reducing the water drag that otherwise would occur and also limiting the amount of water that enters the structural cells 36. The precise configuration of wave shield 102 is not critical; any shape that is effective at reducing water drag may be used.

Once structure 30 has arrived at the intended use site, at least one of the ballast tanks 104 is flooded, allowing wave shield 102 to sink away from structure 30, as shown in FIG. 6. Optionally, the other ballast tank also may be flooded before towing wave shield 102 away from structure 30.

An air line 106 then is attached to exterior access point 47. At that point, the user begins to flood the structural cells 36. For example, air may be vented out of the air inlet/outlets 44, through the air lines 46 (not shown), exterior access point 47 and air line 106. Because the bottoms of structural cells 36 are open, water immediately floods into structural cells 36 when this is done, causing structure 30 slowly to descend into the water, as shown in FIG. 7. However, in the preferred embodiment, some of the air is left within structural cells 36, so as to control the speed at which structure 30 descends into the water.

As noted above, structure 30 preferably has been provided with tilt or level sensors in order to determine whether or not structure 30 is level. Also, the network 45 of air lines 46 preferably has been constructed (e.g., using electrically controlled valves) so as to permit air to be selectively pumped into and/or vented out of the different cells 36. In one representative embodiment of the invention, the air pressure in each quadrant of structure 30 can be separately controlled. Accordingly, if the level sensors indicate that one corner is beginning to drop lower than the rest of structure 30, air can be pumped into the structural cells 36 in the quadrant corresponding to that corner, causing the structure 30 to return to a level orientation. Alternatively, or in addition, in this situation air may be vented from the opposite corner (or from the other three corners), again causing structure 30 to return to a level orientation.

As noted above, structure 30 may be designed to have any desired degree of control over the pumping of air into and venting the air out of the individual structural cells 36. Generally speaking, as more control is desired, additional valves will be required and a more extensive system 45 of air lines 46 and/or control circuitry will be necessary. The control may be exercised mechanically (by providing multiple inlets/outlets), electrically (by providing multiple electrically controlled valves), or any combination of the two.

The foregoing quadrant-based controlled configuration is intended to be only one example. However, such a quadrant-based system is believed to provide an acceptable level of control at a reasonable cost.

Similarly, a variety of different control algorithms for pumping air into and venting air out of the various cells 36 (subject to the degree of controllability provided by the physical control structure employed) may be utilized to maintain structure 30 in a level orientation as it submerged into the water. The foregoing method of pumping air into one corner or venting it from the opposite corner is intended to be only one simple example. It is noted that, depending upon the physical control structure employed, it also may be possible to simultaneously pump air into one portion of structure 30 while venting it from another portion.

In addition to controlling the amount of air in the structural cells 36, ballast tanks 35 may be used to adjust the trim of structure 30. Thus, for example, the algorithm employed might pump air into the ballast tank 35 along a particular edge if it is determined that both corners bounding that edge are dipping relative to the remainder of the structure 30.

As further shown in FIGS. 6 and 7, structure 30 preferably has at least one cable-attachment point 110 that may be used for towing structure 30 and/or for lowering structure 30 into the water using a cable 112. Attachment point 110 is provided during construction of structure 30 and may, for example, be attached to the reinforcing structure embedded within structure 30. Although only one cable-attachment point 110 is illustrated, multiple attachment points 110 also are contemplated, such as one at each corner of anchor 30. In addition, the cables attached to such multiple attachment points may be separately winched, thereby providing an additional means for keeping structure 30 in a level orientation as it is submerged or raised.

FIG. 8 illustrates structure 30 after it has settled on the bottom 113 of the ocean (or other body of water). As shown, shoulder 30 prevents structure 30 from sinking too deeply into the ocean floor. This may be helpful for when structure 30 ultimately is raised back up. At the same time, tapered downward projections 34 sink into the bottom surface, providing a more effective anchor. At this point, any air remaining in structural cells 36 is completely evacuated. Such evacuation eliminates any buoyancy that anchor 30 otherwise might have. In addition, to the extent that the bottom of structural cells 36 forms a sufficient seal with the ocean floor 113, a suction effect can occur. That is, in the pressure from the water above structure 30 presses anchor 30 down against the ocean floor 113, thereby further enhancing the anchoring effect.

Thus, in the current embodiment of the invention, several different phenomena work together to increase the anchoring effect: (i) the sheer weight of anchor 30; (ii) the suctioning effect described above; (iii) the implanting of projections 34; and (iv) the "barn door" effect provided by the large surface area of anchor 30. Once anchor 30 is on the ocean floor, the opposite end of air line 106 may be attached to the vessel (or other structure) that is being anchored or else may be attached to a buoy 114 which is then floated on the surface of the water (as shown in FIG. 8). In this latter case, passing ships may access buoy 114 in order to connect to air line 106. As a result, this configuration allows the user to easily raise anchor 30 when desired.

When it is desired to raise anchor 30, it often only will be necessary to pump air back into structural cells 36, thereby causing anchor 30 to float toward the surface. Once again, air may be selectively pumped into or vented out of particular structural cells 36 in order to keep anchor 30 level during its ascent. Generally speaking, shoulder 32 will be adequate to prevent too much silt, sand and other bottom material from entering structural cells 36 when anchor 30 has been submerged. However, the same seal that permits the above-described suctioning effect may prevent any water or bottom material that has entered the structural cells 36 from being expunged when one is attempting to pump air into the structural cells 36. If too much water or bottom material remains in the cells 36, then it may become impossible to pump into the cells 36 an amount of air sufficient to lift anchor 30. If this is anticipated to be a problem, then is possible to provide the structural cells 36 with a separate venting opening (e.g. on or near their top surfaces) which may be accessed via an electrically operated valve that can be opened to allow such water or other materials to exit if the mere pumping of air does not work to raise anchor 30. In addition, it is possible to winch anchor 30 up slightly using cable 112, if necessary, to break the seal and free anchor 30 from the ocean floor.

While structure 30 is described above and illustrated in the Figures as having a generally flat top surface, this is not critical. Any other shaped may instead be used. For example, particularly with respect to an anchor, it may be desirable to utilize more of a pyramid shape, in order to help maintain the orientation of the anchor during its ascents and descents. One drawback of such a configuration is that it may reduce the "barn door" effect, possibly lessening the anchoring properties.

The fabrication technique described above, while representative of the present invention, provides only one embodiment. Other variations also are possible. For example, FIGS. 9A-9C illustrate three different configurations for the structural cells 36. In each of FIGS. 9A-9C, the illustrated structural cell 36 has an open bottom. The embodiment shown in FIG. 9A closely conforms to the description set forth above. However, the embodiments shown in FIGS. 9B and 9C illustrate that a container or other element may be inserted into each structural cell 36 (or any subset of the structural cells 36) so as to effectively enclose the interior (or a portion thereof) of each (or any) structural cell 36.

More specifically, FIG. 9A shows a structural cell 36 (together with the construction thereof) that is very similar to the structural cell and corresponding construction technique described above. In this embodiment, the forming cell 20a has an opening 29 in its top surface for allowing air to transfer into the structural cells 36 when the platform 10 is submerged. Also, forming cell 20a may have an opening in its bottom surface (e.g., opening 28, as described above); its bottom surface may be completely omitted so as to have a fully open bottom; or any other opening may be provided for permitting air to enter forming cell 20a. In any event, the entire forming cell 20a is separated from the structural cell 36 (and, for that matter, the entire structure 30), typically when the platform 10 is submerged. As a result, air is permitted to freely enter the structural cell 36 from opening 29 through the open bottom of structural 36 and, in addition, air may enter or be vented from a provided inlet/outlet 44, which preferably is provided on a plastic liner 40, as described above.

In the embodiment illustrated in FIG. 9B, the flow of air into and out of the open bottom of structural cell 36 is prevented by the use of an inflatable/collapsible sack 50. More specifically, in this embodiment the forming cell 20b has a detachable top surface 52 which, in turn, has an opening 54 that is attached in an airtight manner to sack 50. Opening 54 may in fact include inlet/outlet 44, with plastic liner 40 fitting over (and, preferably, securely attaching to) inlet/outlet 44, as well as fitting over the rest of structural cell 36. Alternatively, plastic liner 40 may include inlet/outlet 44, with inlet/outlet 44 then attaching to opening 54. Still further, plastic liner 40 may be omitted entirely, with top surface 52 providing inlet/outlet 44, in which case top surface 52 preferably includes spurs or other means for strengthening the attachment of top surface 52 to the concrete or other construction material utilized.

As also shown in FIG. 9B, forming cell 20b in this embodiment of the invention includes a middle surface 56, just below its top surface 52. Together, top surface 52, middle surface 56 and the sidewalls of the forming cell 20 form a compartment for enclosing sack 50. As platform 10 is submerged, the detachable top surface 52 remains fixed to the concrete (or other construction material), thereby detaching from the remainder of forming cell 20b. At this point, air is pumped into sack 50 through inlet/outlet 44, filling the vacuum formed between middle surface 56 and top surface 52. More specifically, the air entering through inlet/outlet 44 will inflate sack 50, which in turn will fill the vacuum. Otherwise, if air is not pumped into sack 50 or otherwise allowed to enter sack 50, then water will be forced upwardly to fill the vacuum. Similarly, whenever sack 50 is inflated with air (e.g., when air is pumped into sack 50 in order to raise the structure 30), the water will be pushed out, causing structural cell 36 to become buoyant. Alternatively, when air is vented from sack 50 through inlet/outlet 44 (causing it to deflate), water will rush into structural cell 36 to fill the vacuum, thereby reducing its buoyancy.

In any event, as long as sack 50 retains its integrity, it preferably will only hold air (in greater or lesser volumes, as determined by the user). The water in such cases typically will fill the spaces within the structural cell 36 that are not occupied by the sack 50. In the preferred embodiments of the invention, sack 50 is formed of a highly flexible plastic, synthetic rubber or other polymer.

It is noted that the use of a sack 50 often will prevent air from inadvertently escaping from the structural cells 36. This may be an issue where turbulent waters are expected, causing structure 30 to tilt frequently during its ascents and/or descents.

In the embodiment shown in FIG. 9C, the entire forming cell 20c detaches from platform 10 and continues to occupy the interior of structural cell 36 when platform 10 is submerged. As shown in FIG. 9C, forming cell 20c may be configured as a hollow chamber having an inlet/outlet 44 extending from its top surface. In such a case, forming cell 20 itself may be otherwise watertight, or it may be provided with a liner made of plastic or other watertight material. In either case, the exterior surface presented by forming cell 20 and any such liner preferably includes spurs or other means for more securely attaching forming cell 20 to the concrete (or other construction material used).

In the embodiment illustrated in FIG. 9C, the entire interior of structural cell 36 is occupied by an enclosed chamber or tank, with the only opening being inlet/outlet 44. Accordingly, air and water may only enter or exit structural cell 36 through inlet/outlet 44. Of course, it is also possible to provide separate openings for the air and water. For example, an opening 28 (which may be controllable through the use of a valve) may be provided in the bottom surface of forming cell 20c.

Alternatively, the forming cell 20c that remains within the interior of structural cell 36 may be configured as a fixed positive buoyancy structure, such as a block of Styrofoam. Still further, the present invention is flexible enough to accommodate structural cells 36 having variable buoyancy (any combination of cells having solid inserts, cells having sack-like inserts and cells without inserts) and other structural cells 36 having fixed buoyancy. Where a solid insert is to be disposed within the interior of a structural cell 36 (such as it is illustrated in FIG. 9C), such insert preferably is lightly attached to platform 10, such as by snap-fitting the insert to platform 10, thereby allowing it to readily detach from platform 10 when sufficient separating force is applied (e.g., when platform 10 is submerged).

In the foregoing discussion, it was assumed that structure 30 is an anchor. The above-described construction technique for anchor 30 allows very large anchors 30 to be constructed in the water, with almost no specialized equipment other than a variable-buoyancy mold, and then towed to their use sites. As a result, such very large anchors often can be fabricated faster and cheaper than conventional techniques would permit. Similar advantages can be obtained with respect to structure is other than anchors. Moreover, these advantages provide a range of opportunities for water-based structures that are not feasible using conventional techniques. A representative application utilizing such an anchor is now described.

Static Breakwater

Figure 10:
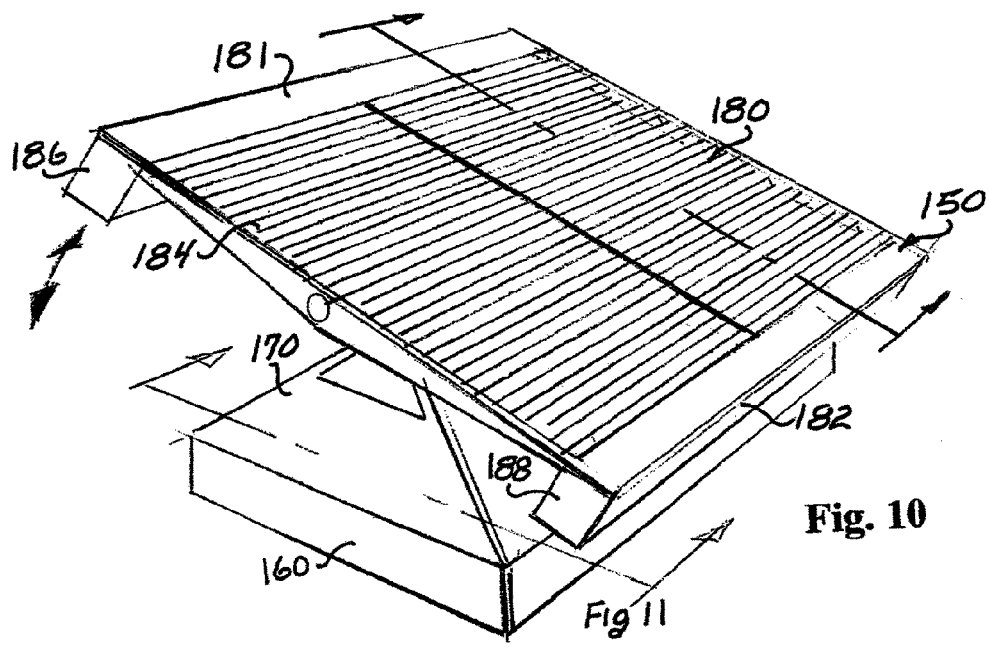
FIG. 10 is a perspective view of a static breakwater apparatus according to the present invention.
Figure 11:
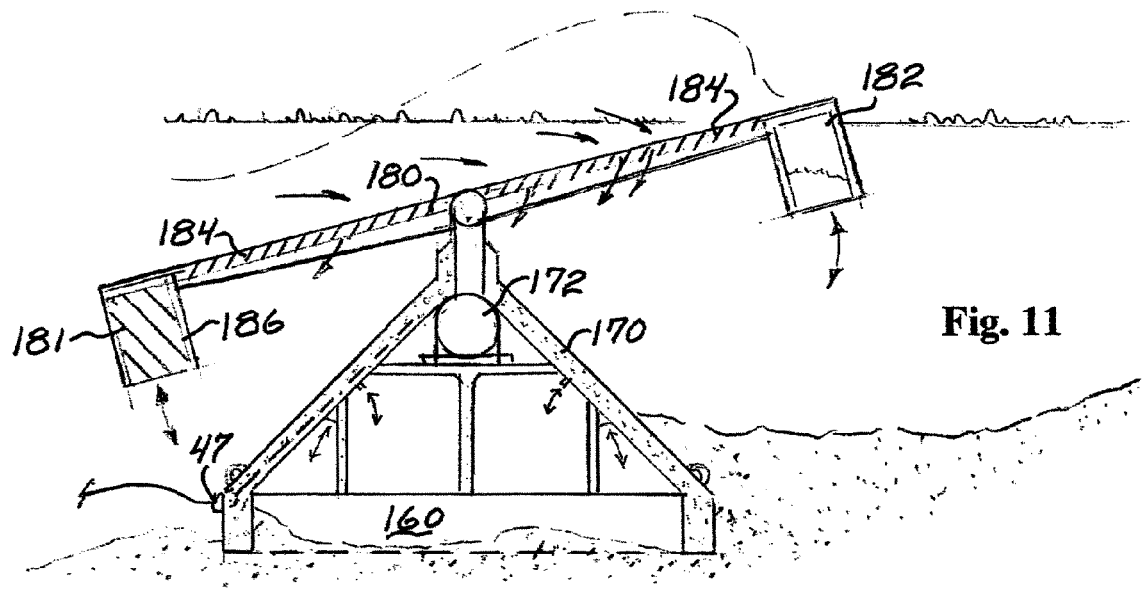
FIG. 11 is a side cross-sectional view of the static breakwater shown in FIG. 10.

FIG. 10 is a perspective view and FIG. 11 is a side cross-sectional view of a static breakwater apparatus 150 according to the present invention. As shown in FIGS. 9 and 10, the primary components of breakwater 150 are a base 160, a tower 170 on top of base 160, and a panel (or beach) 180 pivotally mounted on top of tower 170. Beach 180 has a front edge 181 that faces the open ocean and a rear edge 182 that faces the shoreline in normal use.

The base 160 preferably has been fabricated using the techniques described above. That is, base 160 includes a plurality of structural cells 36 into which air may be pumped and from which air may be vented in order to control the buoyancy of base 160 and, accordingly, the entire breakwater 150.

On top of base 160, a tower 170 has been constructed. In the present embodiment, tower 170 has a triangular vertical cross-section, having the same size and shape across the entire width of tower 170. Tower 170 also has a rectangular horizontal cross-section, having the same dimensions as base 160 at the bottom of tower 170 and becoming progressively smaller from the base 160 to the top of tower 170. This configuration is believed to provide the required height with the best combination of reduced weight and structural strength. In order to provide the adjustable height described below, tower 170 also may be provided, for example, with a bottom section that has a rectangular horizontal cross-section, having two or more telescoping subsections (not shown).

Disposed within tower 170 is an electrical generator 172 and a mechanical transmission system (not shown) for converting the rocking motion of beach 180 into rotational motion and for transmitting such rotational motion to generator 172. Generally, it will be preferable to utilize a flywheel in connection with generator 172 in order to maintain a more constant source of rotational energy. Typically, the transmission system will include two subsystems: one for transferring the clockwise rotational energy of beach 180 to the flywheel and one for transferring the counter-clockwise rotational energy of beach 180 to the flywheel. Any of a variety of conventional mechanical transmission systems and electrical generators may be utilized for this purpose, the specific transmission system and generator 172 utilized not being critical to the present invention.

In addition to the electrical generator and mechanical transmission system, tower 170 may also house other elements, such as: a rechargeable battery, an electrolysis system for generating hydrogen from ocean water (which may be stored in a hydrogen tank system, as described below), and/or any other device for storing energy provided by generator 172. In the preferred embodiment of the invention, tower 170 has a variable height, e.g., comprised of two or more telescoping sections, and also houses an electrical hydraulic pump and corresponding hydraulic system for altering the height of tower 170.

In the preferred embodiment of the invention, tower 170 also contains a large amount of air, providing an overall approximately neutral buoyancy to the combination of tower 170 and beach 180. As a result, the total buoyancy of breakwater 150 preferably is entirely or mostly determined by the buoyancy of base 160.

As shown, beach 180 includes a plurality of slats 184 on its top surface. The slats 184 are arranged so as: to run parallel to the front 181 and rear 182 edges of beach 180, to be spaced apart sufficiently to permit water to flow between slats 184, and to be angled in a downward manner from the rear edge 182 to the front edge 181 of breakwater 150. As a result of this configuration, water coming across the top of beach 180 will pass through slats 184, and then be directed underneath beach 180 and toward the front edge 181 of breakwater 150, in the manner shown in FIG. 11.

As noted above, beach 180 is pivotally mounted to the top of tower 170. The pivot point preferably is at or near the center of beach 180, although it may instead be at any other point along with the length of beach 180. The normal orientation of beach 180 is to be angled such that the upper surface of beach 180 faces toward the open ocean, so as to receive waves as they approach the shore. More preferably, the normal orientation of beach 180 is approximately 45 degrees from vertical. In the preferred embodiment so the invention, the foregoing normal state is the equilibrium state of the beach 180, meaning that beach 180 is weighted so as to naturally tend to return to such normal state.

This normal orientation of beach 180 may be achieved in a variety of different ways. One way is to utilize a counterweight at the front edge 181 of beach 180. This counterweight preferably is in the form of a variable-buoyancy element 186 having at least one electrically operable valve for allowing air into and venting air out of element 186. The element 186 may be provided as an open-bottomed chamber or as a ballast tank. In such an embodiment, it may be possible to control the normal orientation of beach 180 merely by adjusting the buoyancy of element 186. However, it also may be desirable to include a mechanical stop in order to prevent beach 180 from over-rotating in the counter-clockwise direction, which mechanical stop may utilize a spring to absorb any sudden impacts. Alternatively, or in addition, the normal orientation described above may be achieved by moving the pivot line of beach 180 closer to rear edge 182.

At the rear edge 182 of beach 180, a buoyant element 188 preferably is provided. This buoyant element 188 preferably, although not necessarily, is configured as a hollow chamber having an open bottom.

In use, a wave 190 approaches beach 180 and the force of the wave 190 causes beach 180 to rotate in the clockwise direction, pushing element 188 underneath the surface of the water. Because element 188 is buoyant, it tends to resist such submersion, thereby absorbing energy from wave 190. At the same time, slats 184 redirect the wave energy back out toward the ocean, thereby further dissipating such energy. In addition, electrical generator 172 converts some of the energy of wave 190 into electrical power, thereby further absorbing the wave's energy.

Once wave 190 has passed, the buoyancy of element 188, together with the normal stabilizing forces acting to return beach 180 to the normal position, causes beach 180 to rotate counter-clockwise. This counter-clockwise rotation is partially dampened by electrical generator 172, which further converts such rotational energy into electrical power. Eventually, possibly after some additional rocking back and forth (which is used by generator 172 to generate electrical power), beach 180 again returns to the normal position and is ready to receive the next wave.

In the foregoing embodiment, beach 180 is largely passive. However, the use of a variable-buoyancy element 186 at the front edge 181 of beach 180 provides the opportunity for a more active device. For instance, dynamically altering the buoyancy of element 186 during the rocking motion of beach 180 may allow for more efficient conversion of the wave energy to usable energy or may increase the wave dampening effect, at the discretion of the user.

As noted above, tower 170 preferably has an adjustable height. In the preferred embodiment of the invention, this height is adjusted to accommodate changes in the tides. That is, the height of tower 170 preferably is adjusted so that in the normal orientation, the front edge 181 of beach 180 is in the water and a desired surface area of beach 180 is out of the water. For this purpose, the appropriate height may be determined remotely and transmitted to breakwater 150 (in which case breakwater 150 should be provided with an appropriate receiver) or may be determined on breakwater 150 itself by using appropriate tide-level sensors. One example of such a tide-level sensor is to make small adjustments in the height of tower 170 during an incoming wave 190 and then either (i) maintain the adjustment if the adjustment results in an increase the amount of force that the wave 190 exerts on beach 180; or (ii) return to the previous height or even adjust in the opposite direction if the first adjustment had no effect or reduced the amount of force that wave 190 exerted on beach 180. Preferably, the height of tower 170 is adjusted using an electrical hydraulic pump and hydraulic system, operated using electrical energy generated by electrical generator 172.

In addition to dampening wave energy and generating electrical power, the above-described configuration of breakwater 150 also can provide a significant amount of sand retention. In particular, the large structure provided by base 160 and tower 170 often will prevent sand from being swept out into the ocean.

Because breakwater 150 is provided as a single unit, it can be towed to the desired use site and then sunk, in the manner described above. Generally, it will be preferable to wait for a calm wave condition in which to sink breakwater 150, in order to help ensure that breakwater 150 descends in a level orientation.

Floating Breakwater

An additional embodiment of the invention using a re-floatable structure 30 as an anchor will now be described. This embodiment is a breakwater that is similar to the static breakwater embodiment described above. However, in this embodiment the breakwater is free-floating and only tethered (or otherwise attached) to the anchor. An example of such a free-floating breakwater is breakwater 200 shown in FIGS. 12 and 13.

As shown, breakwater 200 includes an anchor 210 and a panel (or beach) 230 that is attached to the anchor 210 by three cables, chains or similar tethers 212. For ease of description, the following discussion will assume that tethers 212 are cables. In addition, it should be understood that in alternate embodiments, such tethers 212 may be replaced by a rigid structure for attaching beach 230 to anchor 210.

In the preferred embodiment of the invention, anchor 210 has variable-buoyancy and has been formed in the manner described above with respect to the construction of structure 30. Here, the structure 30 produced by that technique is functioning primarily as an anchor, although as will be apparent below, it may be provided with additional functionality as well. Because anchor 210 has been fabricated using the techniques described above, it may be simply towed to its intended use site and then submerged into the water. In this case, the air line 106 that is attached at one end to anchor 210 preferably is attached at its other end to a buoy, so that a ship may subsequently attach to the air line 106 and then raise anchor 210 when desired, e.g., in order to perform any necessary maintenance.

Mounted on anchor 210 is a conventional swivel device 214 that functions as an attachment point for cables 212. In the preferred embodiments, the swivel device 214 permits rotation in two orthogonal planes (e.g., horizontal and vertical). As a result, the swivel device 214 allows panel 230 to move closer to or farther away from the anchor 210, as well as moving from side to side. One advantage of this is that panel 230 will tend to automatically align itself with an incoming wave, as shown in FIG. 14. Another is that panel 213 typically can automatically adjust to different tidal conditions.

Disposed at the front edge 231 of panel 230 is a weighting element which preferably is implemented as a ballast tank 232 or other variable-buoyancy element. An air compressor within anchor 210 is capable of pumping air into a ballast tank 232 or venting air from ballast tank 232. As a result, ballast tank 232 has variable-buoyancy. In the normal state of beach 230, ballast tank 232 is at least partially flooded so that the front edge 231 of panel 230 is submerged beneath the surface of the water.

The rear edge 235 of beach 230 is provided with a buoyant element 238 that preferably has variable-buoyancy and, more preferably, is implemented as a ballast tank; in this case, anchor 210 preferably is capable of independently pumping air into and venting air from buoyant element 238. In the normal state of beach 230, buoyant element 238 is at its maximum buoyancy, thereby lifting rear edge 235 out of the water. As shown in FIG. 13, just behind buoyant element 238 is a hollow open-bottomed chamber 240. In the preferred embodiment of the invention, chamber 240 is connected via an air hose 242 to anchor 210.

In operation, beach 230 is angled as shown in FIGS. 12 and 13, with the front edge 231 in the water and the rear edge 235 out of the water. The force of the waves causes beach 230 to become oriented such that the front edge 231 is facing the direction from which the waves are coming. The same force pushes beach 230 so that the cables 212 typically remain taut, as shown in FIGS. 12 and 13. When a wave arrives at beach 230, the force of the wave of pushes rear edge 235 into the water. This force is resisted by the buoyancy of buoyant element 238 as well as the buoyancy of open-bottomed chamber 240, thereby dampening some of the energy of the incoming wave. In addition, beach 230 is provided with slats 244 that are similar to slats 184, described above. More specifically, slats 244 redirect the energy of the incoming wave so that it goes underneath beach 230 and back out toward the direction from which the incoming wave is arriving. This action further helps to dissipate the wave energy.

Lastly, as noted above, open-bottomed chamber 240 is connected to anchor 210 via air hose 242. Thus, when chamber 240 is forced into the water, the air within chamber 240 becomes compressed, and this compressed air travels down air hose 242 to anchor 210, where it is used to drive a flywheel, which in turn drives and electrical generator in anchor 210. A portion of the wave energy is thereby converted into electrical energy, which, for example, may be stored in batteries disposed within anchor 210.

After the wave passes, buoyant element 238 (and any remaining buoyancy of chamber 240) pushes rear edge 235 of beach 230 back out of the water. When this occurs, the weight of the water within chamber 240 creates a suctioning effect, pulling the air back up from anchor 210. This additional air movement also can be utilized to drive the flywheel and generator in anchor 210, thereby generating additional electrical power. Alternatively, air may be sucked into chamber 240 through valve 246 and snorkel 247. In any event, with rear edge 235 out of the water and front edge 231 still submerged, beach 230 is in position to receive another wave.

In the present embodiment, the use of an open-bottomed chamber provides compressed air, which is then used to drive an electrical generator. In other embodiments of the invention, the open-bottomed chamber may be replaced with a hydraulic cylinder or similar hydraulic device, with the hydraulic piston facing the water when the beach 230 is in its normal state. Then, when the rear edge 235 is pressed into the water by the incoming wave, the force exerted by the water pushes the piston into the cylinder, thereby forcing pressurized hydraulic fluid into anchor 210 where it is used to drive the electrical generator (e.g., via a flywheel). Although this alternate configuration may be more expensive to construct, it generally will be more efficient for generating electrical power because the energy is transferred to the generator using hydraulic fluid, which is far less compressible, and therefore more efficient for the present purpose, than air.

Certain advantages of implementing the weighting element at the front edge 231 and the buoyant element 238 at the rear edge 235 of beach 230 as variable-buoyancy components are as follows. In the event of severe wave conditions, both such components may be flooded, causing the entire beach 230 to sink down below the level of the severe weather conditions. In addition, a safety line 248, preferably is attached at one end to anchor 210 and to the other end at a safety valve on each of the ballast tank 232 and ballast tank 238. Then, if beach 230 becomes separated from anchor 210, the foregoing safety valves are pulled open by safety line 248, causing both of ballast tanks 232 and 238 to become flooded and beach 230 to thereby sink. This configuration typically will prevent a situation where a detached floating beach 230 potentially could become a water hazard.

Additional Comment Regarding Breakwater Embodiments

In the foregoing breakwater embodiments, the panels 180 or 230, respectively, are shown as having a single-plane configuration. However, this is not critical; rather, other configurations (e.g., involving multiple segments angled relative to each other and/or various combinations of straight and/or curved segments) for panels 180 and 230 may be utilized, as appropriate.

Wind-Driven Power Generator

The present embodiment of the invention concerns a water-based wind-driven power-generating system. In this embodiment, a structure 30 preferably is used as the anchor, while another structure 30 may be used as the base for the generator platform.

Figure 15:
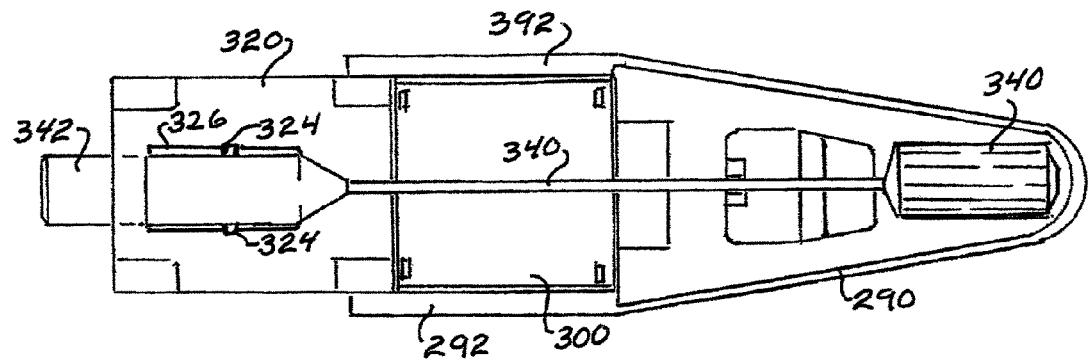
FIG. 15 is a top plan view of an assembly for deploying a water-based wind-driven power generating system according to the present invention.

FIG. 15 is a top plan view of an assembly 280 for deploying such a generating system according to the present invention. As shown, deployment assembly 280 consists of three major subcomponents: a towing vessel 290, an anchor 300 and a platform assembly 320. The towing vessel 290 preferably has arms 292 that support and hold the anchor 300 and the platform assembly 320 while they are being transported to the use site.

In the preferred embodiment, anchor 300 has been fabricated in the same manner as structure 30, described above. Accordingly, anchor 300 has a plurality of open-bottomed chambers that allow it to have variable buoyancy. However, any other variable-buoyancy or other type of anchor instead may be used. As noted above, the use of a structure 30 for anchor 300 generally will reduce the cost of fabricating and transporting anchor 300 to the desired use site. For similar reasons, a structure 30 also may be used as the base for platform assembly 320 (e.g., with the additional subcomponents described below constructed on top of this base).

Figure 16:
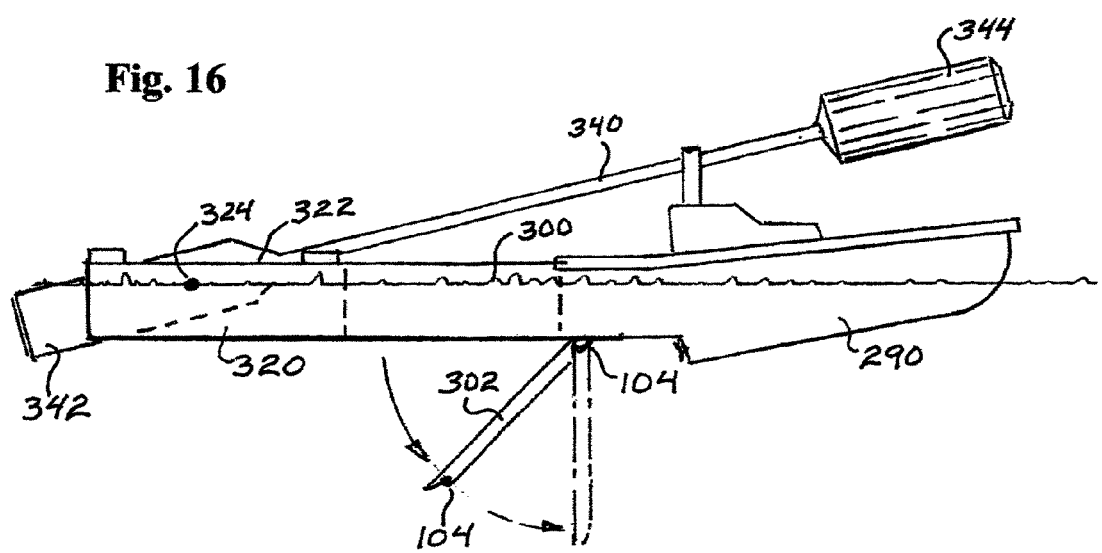
FIG. 16 is a side elevational view of the deployment assembly shown in FIG. 15.

FIG. 16 is a side elevational view of the deployment assembly 280 and, in conjunction with FIG. 15, is helpful for describing platform assembly 320 in more detail. A wave shield 302 is installed underneath anchor 300, covering the underside of anchor 300 in order to reduce drag and, in the event that anchor 300 includes open-bottomed chambers, to prevent water from entering such chambers. Preferably, wave shield 302 is similar or identical to wave shield 102, described above.

Platform assembly 320 has two major components: a platform 322 and a windmill tower 340 that is pivotally attached to platform 322 at a pair of pivot points 324. At the lower end of windmill tower 340 is a ballast tank 342, which is disposed beneath (or behind) the pivot points 324. As a result of this configuration, tower 340 is capable of rotating from a vertical or substantially vertical orientation to the near-horizontal orientation shown in FIG. 16. To allow such rotation, a U-shaped cutout 326 is provided in platform 322.

Platform 322 preferably includes an air compressor for pumping air into ballast tank 342 and for venting air out of ballast tank 342, thereby controlling the buoyancy of ballast tank 342. Although not shown, platform 322 itself preferably includes one or more ballast tanks (preferably 4 ballast tanks) for varying the buoyancy of platform 322.

At the top end of windmill tower 340 is a windmill 344 for converting wind power into rotational mechanical energy. Any type of windmill may be utilized for this purpose. However, in the preferred embodiments of the invention, windmill 344 is a vertical-axis windmill, such as a wind turbine having a plurality of vertically oriented blades.

Once the deployment assembly 280 reaches the intended use site, the apparatus is prepared for deployment. Comparing FIG. 17 with FIG. 16 illustrates some of the steps in this regard. Initially, the wave shield 302 is dropped away by flooding at least one of the ballast tanks 104. Then, windmill tower 340 is raised by flooding ballast tank 342. When windmill tower 340 is in a substantially vertical position, it may be locked into place. Next, the required anchoring cables 304 (if not already attached) are attached between platform assembly 320 and anchor 300, and anchor 300 is submerged. Preferably, anchor 300 is submerged in the manner described above for structure 30, e.g., maintaining anchor 300 in a level orientation, allowing it to settle on the bottom of the ocean, and then pumping out any remaining air in order to create a suctioning effect with the bottom of the ocean.

Lastly, with windmill tower 340 raised and anchor 300 on the bottom of the ocean, a winch within platform 322, attached to anchoring cables 304, winches platform 322 beneath the surface of the water. Preferably, platform 322 is winched sufficiently beneath the surface to avoid the most of the severe wave and current conditions that occur near the surface of the water (e.g., at least 25-35 feet below the surface of the ocean). Prior to winching platform 322 beneath the surface, the ballast tanks in platform 322 preferably are partially flooded, reducing the buoyancy of platform 322 to a slightly positive value. By doing so, it generally will be easier to winch platform 322 beneath the water's surface. When platform 322 has been winched sufficiently beneath the surface, the winch is locked and additional air may be pumped into the ballast tanks in platform 322 in order to provide platform 322 with additional stability.

The winching operation itself may be performed by including a coil of cable 304 within platform 322. Alternatively, cable 304 may be supported in a taut manner from the ocean floor to the ocean surface (e.g., by using a buoy-mounted winch). Then, platform 322 can pull itself down cable 304 to the desired depth. Generally speaking, either of the foregoing options is available for any of the winching operations described herein.

FIG. 18 illustrates the final deployed position of platform assembly 320 and anchor 300. As shown, anchor 300 is at the bottom 113 of the ocean, platform 322 is at the desired depth beneath the surface 49 of the water, and windmill tower 340 extends vertically from platform 322 (beneath the water) to a point above the surface of the water, with the windmill 344 itself above the surface of the water. Platform 322 preferably remains somewhat buoyant, but is prevented from rising to the surface by anchoring cables 304. In this state, most of the sensitive equipment is below the region of the water where the most severe conditions occur, with only a portion of the windmill tower 340 within such region.

Moreover, in the event that extraordinarily severe waves, currents and/or weather conditions are predicted or actually detected (either internally by the equipment located on platform assembly 320 or by external sensors, with the information transmitted to platform assembly 320), windmill tower 340 can be folded back into the horizontal position by pumping air into ballast tank 342, thereby forcing the water out, and then tower 340 may be locked into place (e.g., using a self-locking, electrically releasable latch). Once these steps have been completed, platform assembly 320 may winch itself further beneath the surface of the water in order to avoid damage.

For the foregoing purpose, and possibly also for raising platform 322 when desired, platform 322 preferably has access to the air above the surface of the water. This can be accomplished, e.g., by utilizing a buoy with a snorkel attached and an air line running from the buoy to platform 322. It should be noted that such a configuration may be utilized in any of the embodiments herein where a source of air is necessary for altering the buoyancy of any structure but is not otherwise available.

When it is desired to raise platform assembly 320 (e.g., for maintenance or to move the assembly to another location), the foregoing steps are simply reversed. Thus, the winch within platform 322 is unlocked and the anchoring cables 304 unwound, thereby allowing platform 322 to float up toward the surface. Then, air is pumped into ballast tank 342, forcing the water out and causing windmill tower 340 to return to the horizontal position, where it is locked into place. Finally, if desired, anchor 300 may be raised, in the manner described above.

Platform 322 also may be configured in a manner similar to beach 230, described above, i.e., having a safety line attached to anchor 300 so that if platform 322 becomes separated from anchor 300, the ballast tanks for platform 322 (and, possibly, also for tower 340) immediately are flooded. As a result, in such a case platform 322 would sink to the bottom of the ocean, rather than becoming a potential floating hazard.

In the foregoing embodiment, a single anchor 300 is used to anchor platform 322 beneath the surface of the water. However, it is also possible to use multiple anchors for this purpose.

When in use, a transmission system disposed within the main body of windmill tower 340 transfers the rotational mechanical energy produced by windmill 344 to the base of windmill tower 340. This mechanical energy may then be transferred, using an appropriate mechanical transmission system (e.g., hydraulic or air-pressure based), to the platform 322 in order to be converted into usable energy within platform 322. Then, an electrical generator within platform 322 converts the mechanical energy into electrical power. However, such a mechanical transmission system may need to be fairly complicated, given the preferred desired to have windmill tower 340 pivotally attached to platform 322.

Alternatively, the electrical generator for converting the rotational mechanical energy provided by the windmill into electrical power may be disposed within windmill tower 340. Then, this electrical power can be transferred to platform 322 using ordinary electrical power cables. Such a generator may be housed, e.g., directly above the ballast tank 342 within the wider base portion of windmill tower 340. In such an event, as will become apparent below, the generator typically still would be well below the surface of the water and away from most of the potentially damaging waves and currents. In such embodiments, whether such a generator is disposed beneath or above the pivot points 324 will depend upon where weight is needed to provide the desired pivoting action that is described below.

In either of the foregoing cases, electrical power is provided to platform 322. This power may be stored in batteries disposed within platform 322.

Figure 19:
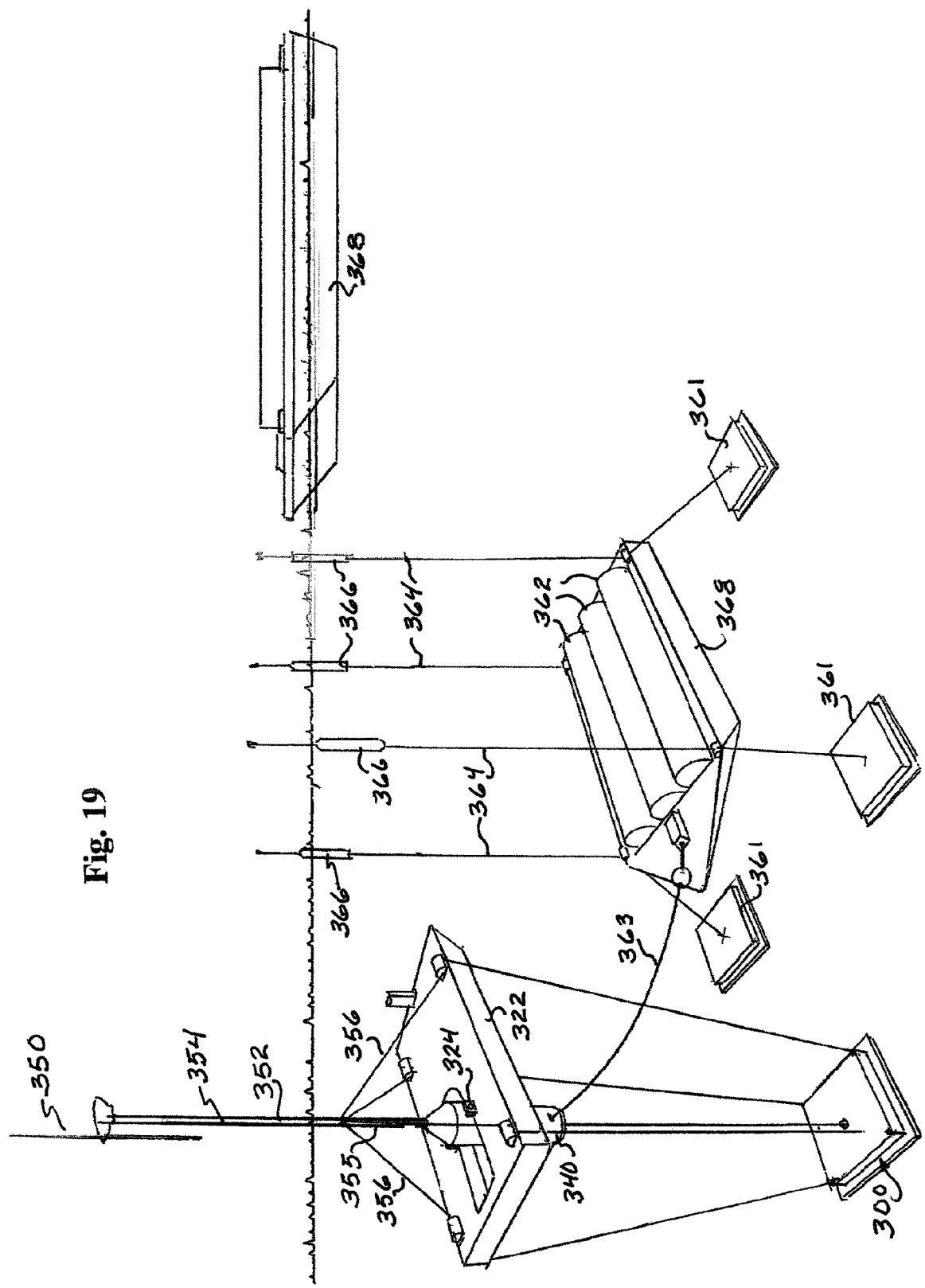
FIG. 19 illustrates a hydrogen collection and transportation system according to the present invention.

An alternative energy-storing system is shown in FIG. 19, which illustrates an embodiment using a horizontal-axis windmill 350. This embodiment is identical to the previous embodiment, except that this embodiment uses a horizontal-axis windmill 350 and an upper section 352 of the windmill tower 354 is capable of rotating, so as to allow windmill 350 to orient itself in the direction of the wind, with the lower section 355 being supported by support cables 356. Accordingly, in general all of the considerations and design options applicable to the preceding embodiment are applicable here as well, and vice versa.

In this embodiment, the generated electrical power is supplied as an input to an electrolysis system for obtaining hydrogen from ocean water. The electrolysis system itself may be disposed within the lower section of the windmill tower 340 or within platform 322. The generated hydrogen is then stored in a structure 360 having a series of hydrogen tanks 362, via a gas line 363 from the tower 340 (as shown in FIG. 19) or platform 322 (if the electrolysis system instead is housed therein) to the structure 360.

As shown, structure 360 preferably is buoyant in operation (having either a fixed or variable buoyancy) and is separately anchored to one or more anchors 361 (four in the embodiment shown in FIG. 19). The anchors 361 preferably have been fabricated using the techniques described above for structure 30.

There are several different alternatives to permit collection of the stored hydrogen. In the first, one or more additional gas lines 364 are provided, extending from the structure 360 to one or more buoys 366 floating on the surface of the water. A passing ship may then attach to the buoy(s) 366 to pick up the stored hydrogen.

Alternatively, the structure 360 is implemented as a barge (as shown in FIG. 19). Once barge 360 is near or at its capacity for storing hydrogen, it is re-floated by releasing its winch locks and pumping air into its ballast tanks, so as to allow it to slowly rise to the surface. Then, when it reaches the surface, both the cables attached to anchors 361 and the line 363 are released and attached to an empty barge 368 that has been summoned to replace barge 360. In the preferred embodiment, a sensor detects when the tanks 362 are nearly full and a radio transmission is made requesting the deployment of replacement barge 368. Barge 368 can then be submerged in the manner described above and barge 360 towed to a location where the collected hydrogen is to be utilized.

The structure 360 also may be fabricated in the manner described above for structure 30, i.e., having a plurality of open-bottomed structural cells 36. In any event, structure 360 preferably has variable buoyancy, which is adjusted as the hydrogen tanks 362 are filled in order to maintain structure 360 at a roughly constant buoyancy and/or to adjust the trim of structure 360.

It should be understood that the storage techniques described above are exemplary only, and the generated electrical power may be stored in any other manner. Of course, it is also possible to avoid the intermediate conversion of mechanical energy to electrical energy, e.g., by directly using the rotational energy to compress air or to perform other mechanical tasks.

Combined Breakwater and Wind-Power Generator

FIG. 20A illustrates a front plan view and FIG. 20B illustrates a side elevational view of a combined wave-energy collection system and wind-power-generating station 400 and according to the present invention. Similar to the wind-power only generating station described above, station 400 utilizes a platform 410 and a windmill tower 420 for converting wind energy into electrical or other usable energy. The tower 420 is counter-weighted using a ballast tank 422 in the same manner described above in connection with ballast tank 342.

Generally speaking, in fact, station 400 may be configured in the same manner as such wind-power only generating station, with the addition of the other features and elements described below. In the presently illustrated embodiment, windmill tower 420 uses a horizontal-axis wind turbine 421. However, it should be understood that a vertical-axis turbine may instead be used.

In addition to a wind turbine for generating usable power, station 400 also is provided with a panel (or beach) 430 for converting wave energy into usable energy. As illustrated, panel 430 is counter-weighted (or otherwise eccentrically weighted) so as to be inclined in the manner illustrated in its equilibrium state. Cables 432 (which may be ordinary cables, belts or chains) are attached to each end of a beach 430 and wrapped around corresponding pulleys 434. Actually, pulleys 434 may be implemented as sprockets, although for convenience such elements generically are referred to as pulleys. Similarly, cables 432 may be replaced by chains, belts or similar structures, but to simplify the discussion are assumed to be cables. In fact, it is preferred that devices 432 have teeth or links that engage with corresponding sprockets along the circumference of pulleys 434, in order to reduce the amount that cables 432 slip against pulleys 434.

The tower 420 has an upper rotatable shaft 435 (similar to rotatable shaft 352, described above), thereby allowing windmill 421 to rotate into an optimal position for receiving the wind. In addition, tower 420 is provided with a lower rotatable shaft 440 that, together with rudder 442, permit beach 430 to rotate into a position in which it directly faces an incoming wave (i.e., so that the direction of the wave motion is approximately orthogonal to the surface of beach 430).

In this position, an incoming wave depresses beach 430 into a horizontal or nearly horizontal orientation. Then, once the wave passes, the beach 430 attempts to return to its equilibrium position and rocks back and forth until this position is obtained. This rocking motion causes cables 432 to turn pulleys 434, which rotation (through an appropriate mechanical transmission system) may be used to drive a flywheel. Such motion, in turn, may be used to generate electrical energy, to compress hydrogen generated by the system or any other gas, or in any other desired manner. As shown in FIG. 20C, beach 430, similar to beaches 180 and 230, described above, has a plurality of parallel slats 431 that are oriented so as to direct the water in the wave 190 through beach 430 and back out toward the direction from which the wave 190 approached. As noted above, such a configuration can further dissipate the wave's energy.

Ocean Current Generator

Figure 21A:
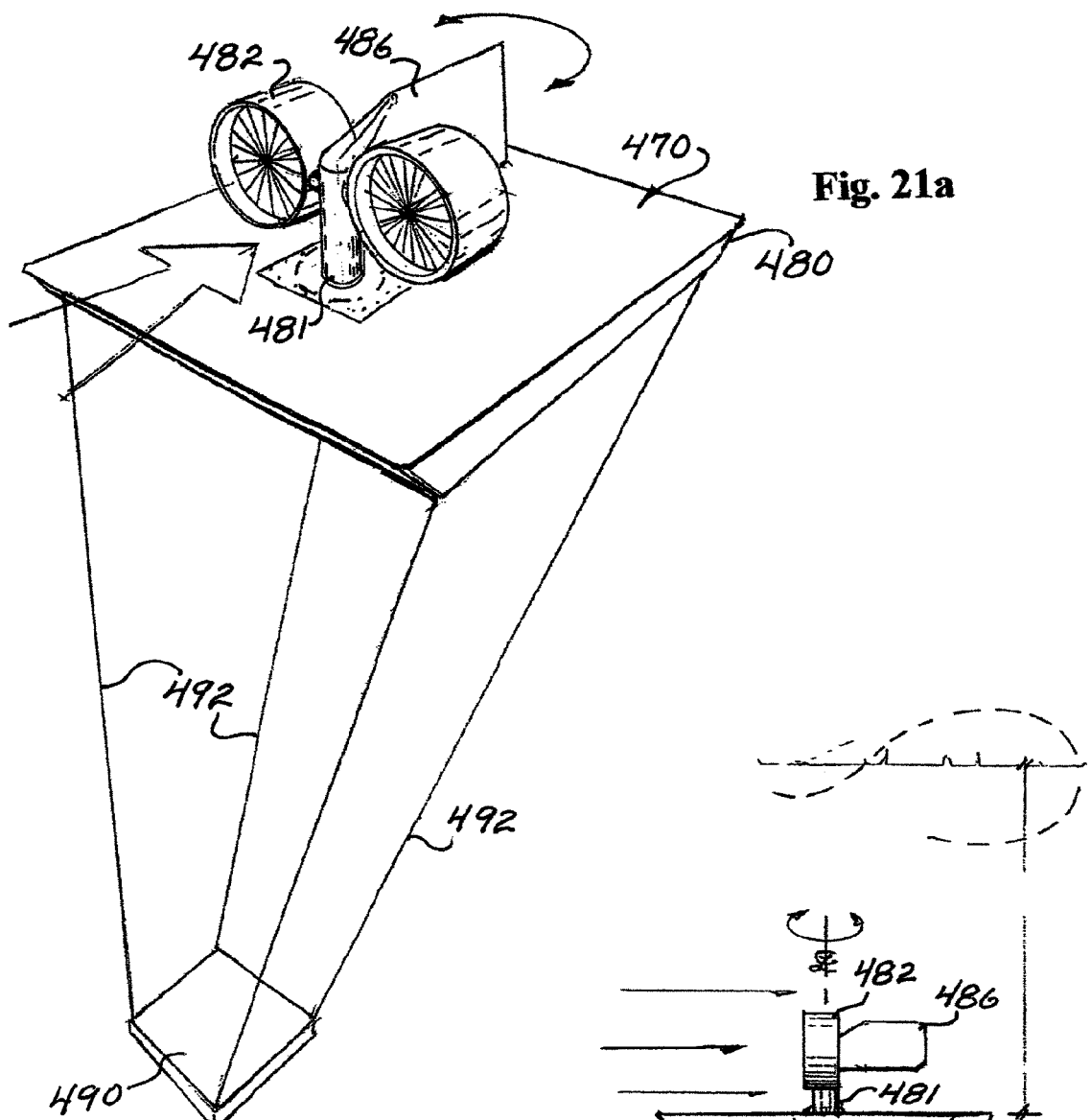
FIG. 21A illustrates a perspective view and FIG. 21B illustrates a side elevational view of an ocean current generating station according to the present invention.
Figure 21B:
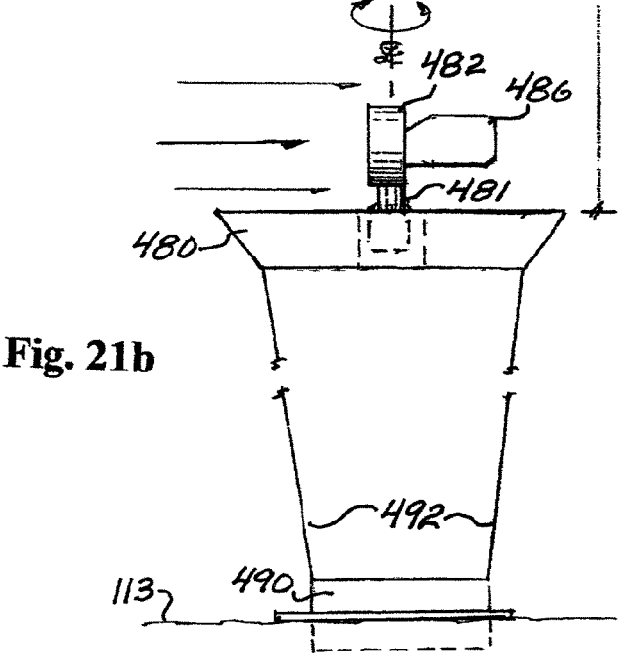

FIG. 21A illustrates a perspective view and FIG. 21B illustrates a side elevational view of an ocean current generating station 470 according to the present invention. Station 470 includes a platform 480 and an anchor 490, both of which preferably having been fabricated using the techniques for fabricating a structure 30, described above. The platform 480 has mounted on it a turbine assembly 481 that includes a pair of horizontal-axis turbines 482 for converting ocean currents into usable energy. In this regard, the rotational motion produced by turbines 482 may be provided to an electrical generator mounted within platform 480 or within turbine assembly 481, may be used to compress gas, or may be used in any other desired manner. As discussed above, any generated electrical power then may be used to produce hydrogen from the ocean water, which hydrogen is stored so as to be accessible, e.g., in the manner described above.

Platform 480 operates beneath the surface of the water. For this purpose, platform 480 preferably is provided with a winch for pulling itself beneath the surface of the water. As with the windmill and combination windmill/breakwater embodiments described above, in operation platform 480 preferably has a positive buoyancy, but is prevented from rising to the surface by anchor 490 and anchor cables 492. Platform 480 and anchor 490 may be deployed, e.g., in a manner similar to that described above for platform assembly 320 and anchor 300. Unlike the previous embodiments, in which the goal was to lower the platform beneath the most severe current and turbulence conditions, in the present embodiment the goal is to lower platform 480 to a depth having the greatest current activity. Otherwise, all of the considerations and design options discussed above in connection with such embodiments also will be applicable to this embodiment (e.g., the procedure for deploying platform 480 and the use of a safety line to sink platform 480 in the event that platform 480 becomes separated from anchor 490).

Cables 492 may be attached to anchor 490 using a two-axis swivel device, thereby allowing platform 480 to rotate into an optimal position for receiving the ocean current energy. More preferably, however, turbine assembly 481 is pivotally mounted on platform 480, so as to be capable of rotating freely. In either event, a rudder 486 is provided for aligning turbines 482 with the incoming ocean current.

Breakwater with Sliding Panel

Figure 22:
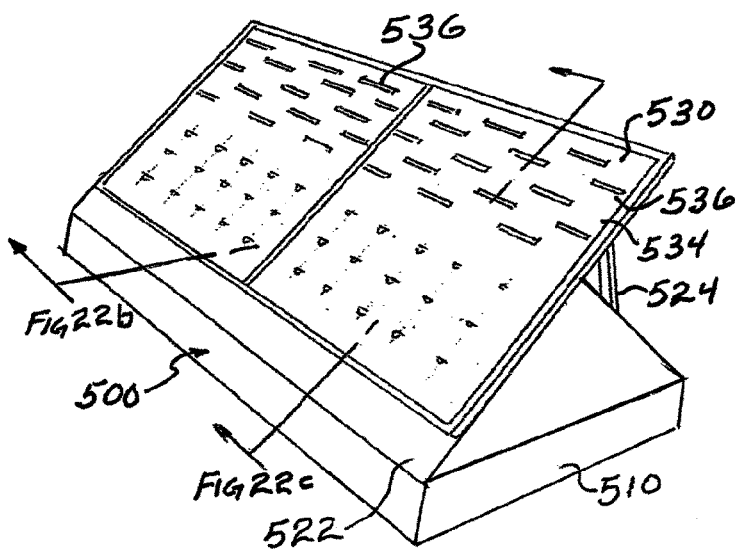
FIG. 22A illustrates a perspective view and FIG. 22B illustrates a cross-sectional view of a breakwater with a sliding panel according to a representative embodiment of the present invention.
FIG. 22C is a detailed cross-sectional view of a portion of the beach for the breakwater illustrated in FIGS. 22A and 22B.
Figure 22:
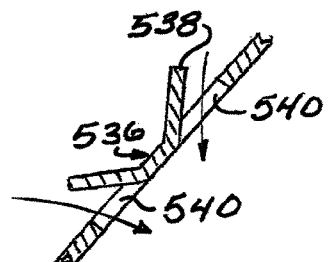
Figure 22B:
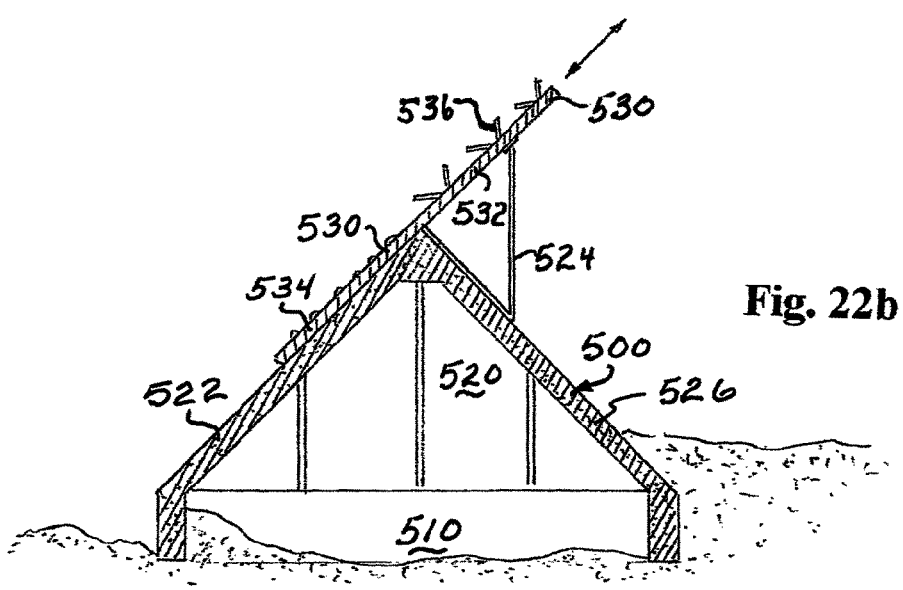

FIG. 22A illustrates a perspective view and FIG. 22B illustrates a cross-sectional view of a breakwater 500 according to another representative embodiment of the present invention. As shown, breakwater 500 includes a base 510, a tower 520 and a panel (or beach) 530. Base 510 is similar to base 160 described above, with the same considerations and design options applying, except as otherwise noted below. Similarly, tower 520 is similar to power 170 described above, with the same considerations and design options applying, except as otherwise noted below. However, unlike beach 180, beach 530 does not rock back and forth, but rather slides up and down an angled front face 522 of tower 520.

Preferably, tracks (not shown) on the rear side 532 of beach 530 engage matching tracks (not shown) on the front face 522 of tower 520, in order to facilitate such sliding action. In addition, a support member 524 (preferably configured as a vertical panel) extends upwardly from the rear side 526 of tower 520 in order to support the weight of beach 530 when it is pushed sufficiently far upwardly to clear the top of tower 520.

In its normal state, beach 530 is at the lower limit of its travel along such tracks and is held in that position by its own weight. In addition, springs, piston assemblies or similar devices may be used to bias beach 530 toward this steady-state position. However, when a wave 190 approaches, the force of the wave 190 pushes beach 530 up along the front face 522 of tower 520, e.g., into the position shown in FIG. 22B. the energy required to lift beach 530 in this manner helps to dissipate the wave's energy. Then, after wave 190 passes gravity returns beach 532 its normal position.

The unique configuration of the front surface 534 of beach 530 further assists in dissipating the energy of an incoming wave 190. The front surface 534 is illustrated in FIG. 22C, in connection with FIG. 22A. As shown in FIG. 22A, the front surface 534 of beach 530 has an array of alternating elements 536 that guide the flow of the wave's energy. A detailed view of one of the elements 536 is illustrated in FIG. 22C. As shown, each element 536 has a backward L-shaped component 538, and both beneath and behind such L-shaped component 538 is a gap 540 for allowing water to pass through beach 530. The result of water passing over an element 536 is that the water flows in the manner indicated in FIG. 22C. This redirection of the wave's energy has the effect of breaking up the wave, thereby enhancing the desired effect.

Although not illustrated in FIGS. 22A-22C, is also possible to utilize the kinetic energy of beach 530 in order to generate usable energy that can be stored in tower 520 or in base 510. For example, a conventional mechanical transmission system can be used to transfer such kinetic energy to an electrical generator. Such electrical energy may then be stored in any of the ways described above. Alternatively, any other desired use may be made of such kinetic energy. In any event, in addition to providing usable energy, an electrical generator or other energy-conversion device typically will present an additional drag on the motion of beach 530 that will further dissipate the energy of an incoming wave 190.

While beach 530 is shown as being beneath the surface 49 of the water, it may instead be preferable to have beach 530 at least partially extending out of the water in its normal state. The precise position of beach 530 preferably is chosen to optimize the desired energy-dissipation properties. Accordingly, it may be desirable to utilize a tower 520 having a variable height, as described in more detail above.

Additional Considerations

In each of the foregoing embodiments, by utilizing the construction techniques described herein the various components (including any anchors) can be constructed in one location and then simply towed to the use site. Such towing typically will involve a separate towing vessel. In certain embodiments, such towing vessel will be provided with side arms for connecting to the anchor(s) and one or more platforms and/or other components (e.g., a hydrogen tank storage component). Alternatively, a simple towing line can be utilized for towing these various components.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality may be ascribed to a particular module or component. However, unless any particular functionality is described above as being critical to the referenced module or component, functionality may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of storing and transporting hydrogen, comprising:
submerging a barge, which includes a storage tank, under a surface of a body of water;
generating hydrogen and storing the hydrogen into the storage tank in the barge while the barge is submerged;
disconnecting the barge from a hydrogen-generation system;
re-floating the barge and then towing the barge to a location where the stored hydrogen is utilized;
connecting a replacement barge to the hydrogen-generation system; and
submerging the replacement barge for underwater storage of hydrogen,
wherein the barge further comprises at least one of ballast tanks and open-bottomed structural cells which provide the barge with variable buoyancy.

2. A method according to claim 1, wherein the barge includes a plurality of storage tanks for storing hydrogen.

3. A method according to claim 1, wherein the barge is re-floated in response to a sensor detection that the storage tank is nearly full.

4. A method according to claim 1, wherein the barge is re-floated upon arrival of the replacement barge.

5. A method according to claim 4, wherein the replacement barge is deployed in response to a radio transmission requesting the replacement barge.

6. A method according to claim 5, wherein the radio transmission is made in response to a sensor detection.

7. A method according to claim 1, wherein the barge includes a plurality of open-bottomed structural cells for submerging and re-floating the barge.

8. A method according to claim 1, wherein the barge is buoyant in operation and is attached to an anchor.

9. A method according to claim 8, wherein the anchor has variable buoyancy, permitting it to be re-floated when desired.

10. A method according to claim 3, wherein the barge has been molded from concrete.

11. A method of storing and transporting hydrogen, comprising:
- submerging a barge, which includes a storage tank, under a surface of a body of water;
- generating hydrogen and storing the hydrogen into the storage tank in the barge while the barge is submerged; and
- re-floating the barge in response to a sensor detection that the storage tank is nearly full and then towing the barge to a location where the stored hydrogen is utilized,
- wherein the barge further comprises at least one of ballast tanks and open-bottomed structural cells which provide the barge with variable buoyancy.

12. A method according to claim 11, wherein the barge includes a plurality of storage tanks for storing hydrogen.

13. A method according to claim 11, wherein the barge includes a plurality of open-bottomed structural cells for submerging and re-floating the barge.

14. A method according to claim 11, wherein the barge is buoyant in operation and is attached to an anchor.

15. A method according to claim 14, wherein the anchor has variable buoyancy, permitting it to be re-floated when desired.

16. A method according to claim 11, wherein the barge has been molded from concrete.

17. A method of storing and transporting hydrogen, comprising:
- submerging a barge, which includes a storage tank, under a surface of a body of water;
- generating hydrogen and storing the hydrogen into the storage tank in the barge while the barge is submerged;
- disconnecting the barge from a hydrogen-generation system;
- re-floating the barge and then towing the barge to a location where the stored hydrogen is utilized;
- connecting a replacement barge to the hydrogen-generation system; and
- submerging the replacement barge for underwater storage of hydrogen,
- wherein the barge is buoyant in operation and is attached to an anchor.

18. A method according to claim 17, wherein the barge has been molded from concrete.

19. A method of storing and transporting hydrogen, comprising:
- submerging a barge, which includes a storage tank, under a surface of a body of water;
- generating hydrogen and storing the hydrogen into the storage tank in the barge while the barge is submerged; and
- re-floating the barge in response to a sensor detection that the storage tank is nearly full and then towing the barge to a location where the stored hydrogen is utilized,
- wherein the barge is buoyant in operation and is attached to an anchor.

20. A method according to claim 19, wherein the barge has been molded from concrete.

* * * * *